(12) United States Patent
Aeloiza et al.

(10) Patent No.: US 12,255,552 B2
(45) Date of Patent: Mar. 18, 2025

(54) METHOD FOR BOOSTING CURRENT COMPENSATION IN AUXILIARY RESONANT COMMUTATED POLE INVERTER (ARCPI) WITH SATURABLE INDUCTOR

(71) Applicant: ABB Schweiz AG, Baden (CH)

(72) Inventors: Eddy C. Aeloiza, Apex, NC (US);
Yuxiang Shi, Cary, NC (US); Goran Mandic, Wake Forest, NC (US);
Weiqiang Chen, Cary, NC (US)

(73) Assignee: ABB Schweiz AG, Baden (CH)

( * ) Notice: Subject to any disclaimer, the term of this patent is extended or adjusted under 35 U.S.C. 154(b) by 331 days.

(21) Appl. No.: 17/975,527

(22) Filed: Oct. 27, 2022

(65) Prior Publication Data
US 2024/0146212 A1  May 2, 2024

(51) Int. Cl.
*H02M 7/539* (2006.01)
*H02M 1/00* (2006.01)
*H02M 7/48* (2007.01)

(52) U.S. Cl.
CPC ......... *H02M 7/539* (2013.01); *H02M 1/0012* (2021.05); *H02M 7/4815* (2021.05)

(58) Field of Classification Search
CPC ....... H02M 7/539; H02M 7/4815; H02M 1/12
See application file for complete search history.

(56) References Cited

U.S. PATENT DOCUMENTS

| | | |
|---|---|---|
| 6,327,286 B1 | 12/2001 | Ness et al. |
| 10,367,413 B2 | 7/2019 | Hamond et al. |
| 2006/0265203 A1 | 11/2006 | Jenny et al. |
| 2017/0244247 A1 | 8/2017 | Hepler et al. |

(Continued)

FOREIGN PATENT DOCUMENTS

EP    2870688 A1    5/2015

OTHER PUBLICATIONS

Dong, "Analysis and Evaluation of Soft-Switching Inverter Techniques in Electric Vehicle Applications," dissertation, Virginia Polytechnic Inst. and State Univ., 259 pp. (Apr. 22, 2003).

(Continued)

*Primary Examiner* — Adolf D Berhane
(74) *Attorney, Agent, or Firm* — Leydig, Voit & Mayer, Ltd.

(57) ABSTRACT

A method for an auxiliary device of an auxiliary resonant commutated pole inverter (ARCPI) to determine a boosting time of the ARCPI is provided. The auxiliary device includes an auxiliary switch path that uses a resonant inductor with at least one saturable inductor. The method includes: calculating, by a processor of the auxiliary device, a first boosting time in the auxiliary switch path based on a theoretical resonance inductance and a voltage that are applied to the resonant inductor; determining, by the processor, a second boosting time in the auxiliary switch path based on a look-up table; and determining, by the processor, the boosting time in the auxiliary switch path based on the first boosting time and the second boosting time. The method further includes controlling, by the processor, boosting current of the ARCPI based on the boosting time in the auxiliary switch path.

20 Claims, 16 Drawing Sheets

(56) References Cited

U.S. PATENT DOCUMENTS

2023/0238897 A1* 7/2023 Nakahara ............... H02P 29/20
                                                              318/504
2024/0348180 A1* 10/2024 Viitanen ............. H02M 1/0064

OTHER PUBLICATIONS

Eckel et al., "FPGA based control of an ARCP-inverter without additional sensors," *European Conference on Power Electronics and Applications* (*EPE*), 4:4.385-4.390 (Sep. 8, 1997).

Engelkemeir et al., "Experimental Investigation of the Performance of Two New Types of Soft-Switching Power Converters for Electric Ships," *2015 IEEE Electric Ship Technologies Symposium* (*ESTS*), 261-267 (Jun. 21-24, 2015).

Kuhn et al., "Performance Characteristics and Average-Value Modeling of Auxiliary Resonant Commutated Pole Converter Based Induction Motor Drives," *IEEE Transactions on Energy Conversion*, 14(3): 493-499 (Sep. 1999).

Waffler et al., "Comparative Evaluation of Soft-Switching Concepts for Bi-directional Buck+ Boost Dc-Dc Converters," *The 2010 International Power Electronics Conference (IPEC-SAPPORO 2010—ECCE Asia)*, 1856-1865 (Jun. 21-24, 2010).

European Patent Office, Extended European Search Report in European Patent Application No. 23206434.5, 10 pp. (Mar. 14, 2024).

* cited by examiner

METHOD FOR BOOSTING CURRENT COMPENSATION IN AUXILIARY RESONANT COMMUTATED POLE INVERTER (ARCPI) WITH SATURABLE INDUCTOR

FIELD

Generally, the present disclosure relates to a pulse width modulation (PWM) auxiliary resonant commutated pole inverter (ARCPI) and, more specifically, to a method and device for a PWM ARCPI with a saturable inductor.

BACKGROUND

A pulse width modulation (PWM) auxiliary resonant commutated pole inverter (ARCPI) is often used to achieve soft switching. A PWM ARCPI provides advantages of high efficiency, operation at higher switching frequencies and ease of control. Currently, a saturable inductor is applied in a PWM ARCPI to mitigate excessive transient voltage in the auxiliary semiconductor devices for the ARCPI. However, due to the non-linearity nature of the saturable inductor, the accuracy of the current controllability through the auxiliary semiconductor devices for the ARCPI is impaired. Generally, the auxiliary semiconductor devices for the ARCPI are able to boost a precise amount of current prior to each commutation instant to ensure a zero-voltage switching and a reduction of switching loss. The use of the saturable inductor mitigates potential overvoltage across the auxiliary semiconductor devices for the ARCPI, however, adds inaccuracies to the boosting current that the auxiliary semiconductor devices are expected to control.

Therefore, there is a need to correct the boosting current that is controlled through the auxiliary semiconductor devices for the ARCPI in consideration of the non-linearity nature of the saturable inductor.

SUMMARY

In an exemplary embodiment, the present disclosure provides a method for an auxiliary device of an auxiliary resonant commutated pole inverter (ARCPI) to determine a boosting time of the ARCPI, wherein the auxiliary device includes an auxiliary switch path that uses a resonant inductor and at least one saturable inductor. The method includes: calculating, by a processor of the auxiliary device, a first boosting time in the auxiliary switch path based on a theoretical resonance inductance and a voltage that are applied to the resonant inductor; determining, by the processor, a second boosting time in the auxiliary switch path based on a look-up table; and determining, by the processor, the boosting time in the auxiliary switch path based on the first boosting time and the second boosting time.

The method further includes obtaining, by the processor, a value of boosting current of the ARCPI. The calculating, by the processor of the auxiliary device, the first boosting time in the auxiliary switch path based on the theoretical resonance inductance and the voltage that are applied to the resonant inductor is made in response to the value of the boosting current of the ARCPI being larger than a threshold. The determining, by the processor, the second boosting time in the auxiliary switch path based on the look-up table is made in response to the value of the boosting current of the ARCPI being less than the threshold.

The determining, by the processor, the boosting time in the auxiliary switch path based on the first boosting time and the second boosting time includes: in response to the value of the boosting current of the ARCPI being larger than the threshold, the boosting time in the auxiliary switch path equaling to the first boosting time in the auxiliary switch path; and in response to the value of the boosting current of the ARCPI being less than the threshold, the boosting time in the auxiliary switch path equaling to the second boosting time in the auxiliary switch path. In response to the value of the boosting current of the ARCPI being larger than the threshold, the boosting time in the auxiliary switch path equaling to the first boosting time in the auxiliary switch path includes the boosting time in the auxiliary switch path equaling to a sum of the first boosting time in the auxiliary switch path and a time at which the at least one saturable inductor reaches a saturation.

The calculating, by the processor of the auxiliary device, the first boosting time in the auxiliary switch path based on the theoretical resonance inductance and the voltage that are applied to the resonant inductor is according to an equation:

$$\frac{Vdc}{2} = L_r \frac{\Delta I}{\Delta t} = L_r \frac{Iboost}{Tboost},$$

where $V_{dc}$ represents the voltage, the voltage being direct current (DC) bus voltage, $L_r$ represents the resonance inductance, $T_{boost}$ represents the first boosting time in the auxiliary switch path, and $I_{boost}$ represents first boosting current corresponding to the first boosting time in the auxiliary switch path.

The look-up table includes at least one non-linear approximation of auxiliary current in the auxiliary switch path. The at least one non-linear approximation is based on curve fitting equations that define a relation between boost current and boost time in the auxiliary switch path.

The method further includes controlling, by the processor, boosting current of the ARCPI based on the boosting time in the auxiliary switch path. The boosting time in the auxiliary switch path is corrected in each switch cycle of the auxiliary switch path based on a measured output of the auxiliary switch path.

In another exemplary embodiment, the present disclosure provides an auxiliary device of an auxiliary resonant commutated pole inverter (ARCPI) for controlling boosting current of the ARCPI. The auxiliary device includes an auxiliary switch path that uses a resonant inductor with at least one saturable inductor. The auxiliary device includes a processor, and the auxiliary device is configured to: obtain a value of the boosting current of the ARCPI; in response to the value of the boosting current of the ARCPI being larger than a threshold, calculate a first boosting time in the auxiliary switch path based on a theoretical resonance inductance and a voltage that are applied to the resonant inductor; in response to the value of the boosting current of the ARCPI being less than the threshold, determine a second boosting time in the auxiliary switch path based on a look-up table; determine a boosting time in the auxiliary switch path based on the first boosting time and the second boosting time; and control the boosting current of the ARCPI based on the boosting time in the auxiliary switch path.

The determining the boosting time in the auxiliary switch path based on the first boosting time and the second boosting time includes: in response to the value of the boosting current of the ARCPI being larger than the threshold, the boosting time in the auxiliary switch path equaling to the first boosting time in the auxiliary switch path; and in response to the value of the boosting current of the ARCPI being less than the threshold, the boosting time in the auxiliary switch path equaling to the second boosting time in the auxiliary switch path. In response to the value of the boosting current of the ARCPI being larger than the threshold, the boosting time in the auxiliary switch path equaling to the first boosting time in the auxiliary switch path includes the boosting time in the auxiliary switch path equaling to a sum of the first boosting time in the auxiliary switch path and a time at which the at least one saturable inductor reaches a saturation.

In response to the value of the boosting current of the ARCPI being larger than the threshold, calculating the first boosting time in the auxiliary switch path based on the theoretical resonance inductance and the voltage that are applied to the resonant inductor is according to an equation:

$$\frac{Vdc}{2} = L_r \frac{\Delta I}{\Delta t} = L_r \frac{Iboost}{Tboost},$$

where $V_{dc}$ represents the voltage, the voltage being direct current (DC) bus voltage, $L_r$ represents the resonance inductance, $T_{boost}$ represents the first boosting time in the auxiliary switch path, and $I_{boost}$ represents first boosting current corresponding to the first boosting time in the auxiliary switch path.

The look-up table includes at least one non-linear approximation of auxiliary current in the auxiliary switch path. The at least one non-linear approximation is based on curve fitting equations that define a relation between boost current and boost time in the auxiliary switch path.

In another exemplary embodiment, the present disclosure provides a method for an auxiliary device of an auxiliary resonant commutated pole inverter (ARCPI) to determine a boosting time of the ARCPI. The auxiliary device includes an auxiliary switch path. The method includes: obtaining, by a processor of the auxiliary device, a value of boosting current of the ARCPI; in response to the value of the boosting current of the ARCPI being less than the threshold, determining, by the processor, the boosting time in the auxiliary switch path based on a look-up table; and controlling, by the processor, the boosting current of the ARCPI based on the boosting time in the auxiliary switch path.

The look-up table includes at least one non-linear approximation of auxiliary current in the auxiliary switch path. The at least one non-linear approximation is based on curve fitting equations that define a relation between boost current and boost time in the auxiliary switch path.

BRIEF DESCRIPTION OF THE DRAWING(S)

FIG. 1 (b) is a schematic diagram of one-phase ARCPI equivalent circuit when using a resonant inductor in series with a saturable inductor with a saturable core in an auxiliary switch path of the ARCPI according to an exemplary embodiment of the present disclosure;

FIG. 2 (b) is a schematic diagram of an equivalent circuit for the boosting current path during the current transition from top IGBT $S_1$ to bottom IGBT $S_2$ when using a resonant inductor in series with a saturable inductor with a saturable core according to an exemplary embodiment of the present disclosure;

FIG. 3 (b) is a schematic diagram of an equivalent circuit for the boosting current path during the current transition from bottom IGBT $S_2$ to top IGBT $S_1$ when using a resonant inductor in series with a saturable inductor with a saturable core according to an exemplary embodiment of the present disclosure;

FIG. 6 (b) is a schematic diagram of corrected theoretical auxiliary current ($I_{aux-t}$) and real auxiliary current ($I_{aux-r}$) across an auxiliary switch path of the ARCPI when using a saturable inductor with a saturable core describing transition threshold current $I_{th}$ according to an exemplary embodiment of the present disclosure;

DETAILED DESCRIPTION

Exemplary embodiments of the present disclosure provide a method for an auxiliary device of an auxiliary resonant commutated pole inverter (ARCPI) to determine a boosting time of the ARCPI. The auxiliary device may include an auxiliary switch path that uses a resonant inductor with at least one saturable inductor. The method provides more accurate boosting current levels in the auxiliary switch path of the auxiliary device of the ARCPI by correcting the boosting time in consideration of the non-linearity of the saturable inductor in the auxiliary switch path of the auxiliary device of the ARCPI.

A saturable inductor is applied in a pulse width modulation (PWM) ARCPI to mitigate excessive transient voltage in auxiliary semiconductor devices for the ARCPI. The saturable inductor is designed to provide high inductance for very low levels of current, and to provide near-zero inductance above a minimum current threshold. The presence of high inductance at very low levels of current prevents excessive diode reverse recovery current and overvoltage during a turn-off by the auxiliary semiconductor switches of the auxiliary semiconductor devices. While above the minimum current threshold, an overall inductance is determined by only the air-core inductance of the saturable inductor, which is a near-zero inductance.

As described above, the use of saturable inductor in the ARCPI is effective in smoothing the auxiliary turn-off current. However, an impact on the accuracy of the boosting current in the ARCPI by the use of saturable inductor needs to be dealt with.

Figure 1A:
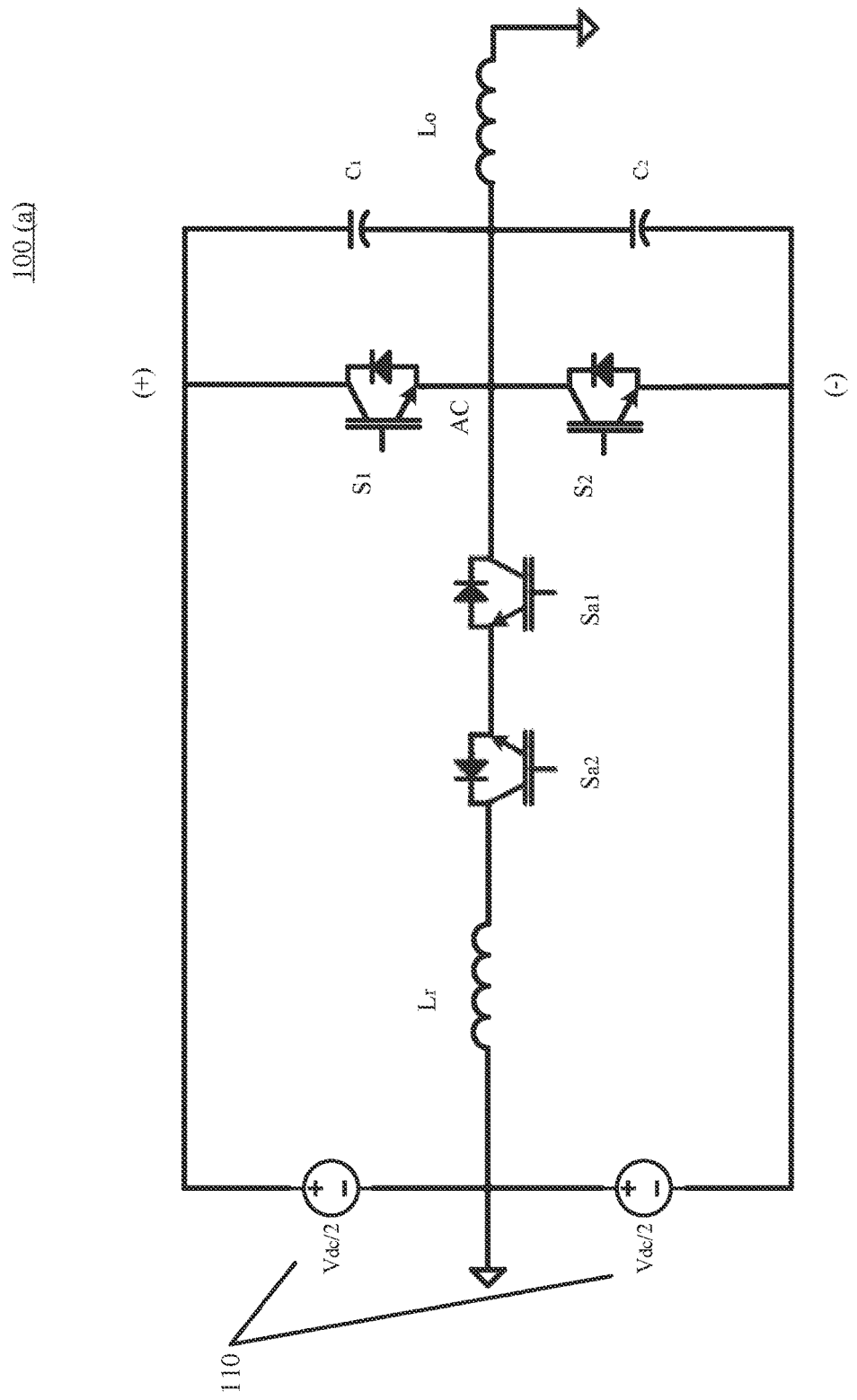
FIG. 1 (a) is a schematic diagram of one-phase auxiliary resonant commutated pole inverter (ARCPI) equivalent circuit according to an exemplary embodiment of the present disclosure.
Figure 1B:
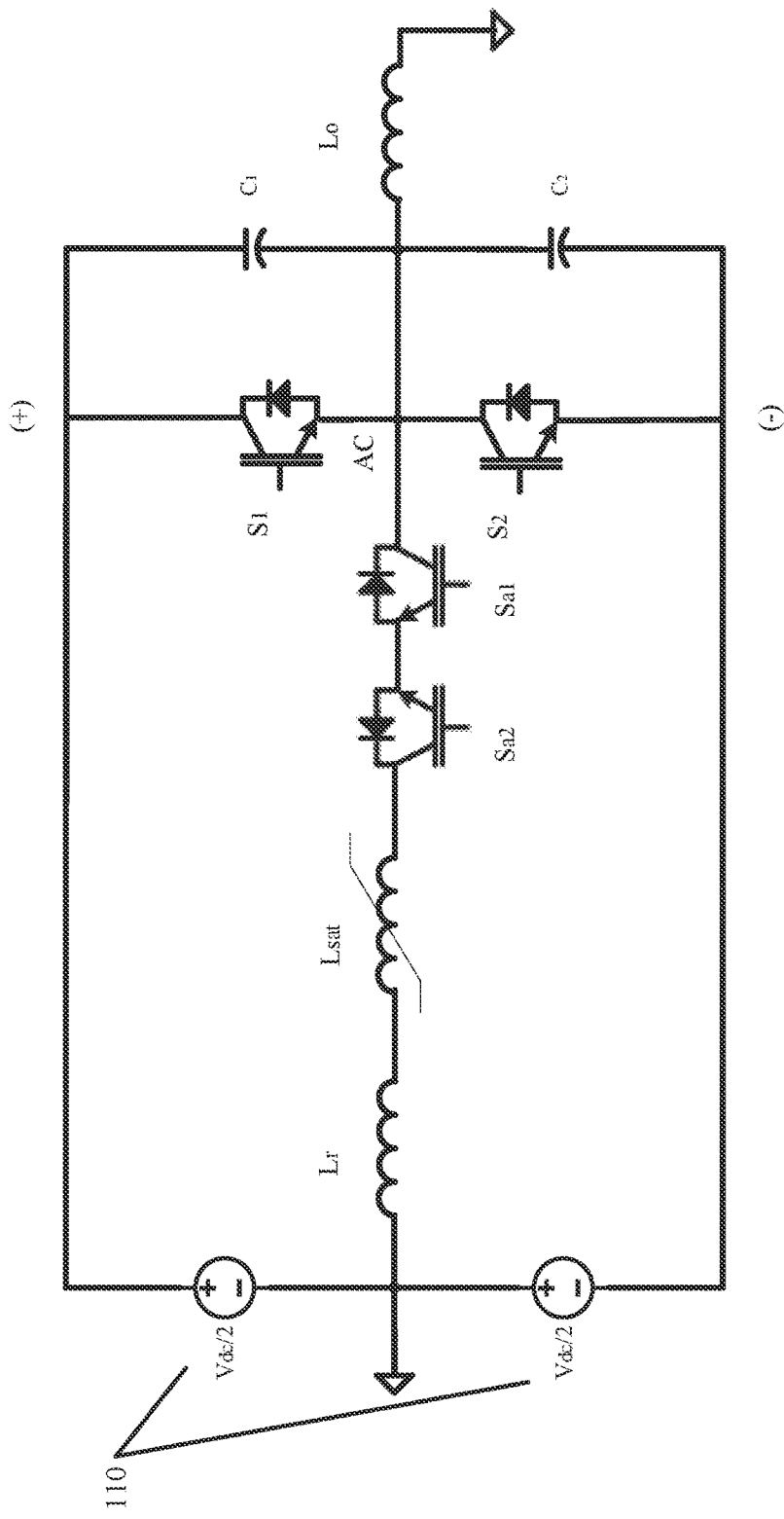

One solution to the issues of inaccuracy of the boosting current is to turn on a delay in a saturable inductor. The solution is exemplified in a situation where a saturable core serves as magnetic pulse compression circuit, namely, a so-called magnetic switch. The voltage applied on the saturable core of the saturable inductor and the overall temperature of the saturable inductor may determine the delay. That means, the saturable core voltage and the saturable core temperature may be monitored and used to adjust a timing of pulse trigger. In an ARCPI, as also shown in FIG. 1 (b), the saturable inductor is in series with a resonant inductor to suppress the reverse recovery of the auxiliary diodes of the auxiliary semiconductor devices for the ARCPI. However, an impact of the saturable inductor on the boosting current in the ARCPI has not been studied, and thus, remains unknown.

Another new development in this field of technology is a so-called "artificial intelligence (AI)-based" controller for the ARCPI. This is a self-adaptive controller, which monitors states of the converter operation and actively learns from initial start-up with unknown conditions. Subsequently, the self-adaptive controller optimizes and adjusts a timing to ensure a correct PWM sequence will be generated for an ARCPI operation. Further, the self-adaptive controller allows larger parameter tolerances, and thus, it is able to handle the non-linearity of the boosting current in the ARCPI caused by the saturable inductor. However, an implementation and feasibility of such an AI-based controller have not been completed or evidenced.

According to some embodiments of the present disclosure, the method for the auxiliary device of the ARCPI to determine a boosting time of the ARCPI may include a processor of the auxiliary device calculating a first boosting time in the auxiliary switch path based on a theoretical resonance inductance and a voltage that are applied to the resonant inductor in the auxiliary switch path of the auxiliary device. The method may further include the processor determining a second boosting time in the auxiliary switch path based on a look-up table. The method may also include the processor determining the boosting time in the auxiliary switch path based on the first boosting time and the second boosting time.

According to some embodiments of the present disclosure, the method may include the processor obtaining a value of boosting current in the auxiliary switch path of the ARCPI. In response to the value of the boosting current in the auxiliary switch path of the ARCPI being larger than a threshold, the method may include the processor calculating the first boosting time in the auxiliary switch path based on the theoretical resonance inductance and the voltage that are applied to the resonant inductor. In response to the value of the boosting current of the ARCPI being less than the threshold, the method may include the processor determining the second boosting time in the auxiliary switch path based on the look-up table.

According to some embodiments of the present disclosure, in response to the value of the boosting current of the ARCPI being larger than the threshold, the method may include the processor determining that the boosting time in the auxiliary switch path equals to the first boosting time in the auxiliary switch path. The method may further include the processor determining that the boosting time in the auxiliary switch path equals to a sum of the first boosting time in the auxiliary switch path and a time at which the at least one saturable inductor reaches a saturation. In response to the value of the boosting current of the ARCPI being less than the threshold, the method may include the processor determining that the boosting time in the auxiliary switch path equals to the second boosting time in the auxiliary switch path.

According to some embodiments of the present disclosure, the method may include the processor calculating the first boosting time in the auxiliary switch path based on the theoretical resonance inductance and the voltage that are applied to the resonant inductor according to an equation:

$$\frac{Vdc}{2} = L_r \frac{\Delta I}{\Delta t} = L_r \frac{Iboost}{Tboost},$$

where $V_{dc}$ represents the voltage, the voltage being direct current (DC) bus voltage, $L_r$ represents the resonance inductance in the auxiliary switch path, $T_{boost}$ represents the first boosting time in the auxiliary switch path, and $I_{boost}$ represents first boosting current corresponding to the first boosting time in the auxiliary switch path.

According to some embodiments of the present disclosure, an auxiliary device of an ARCPI for controlling boosting current of the ARCPI is provided. The auxiliary device may include an auxiliary switch path that uses a resonant inductor with at least one saturable inductor. The auxiliary device may include a processor and be configured to obtain a value of the boosting current of the ARCPI; in response to the value of the boosting current of the ARCPI being larger than a threshold, calculate a first boosting time in the auxiliary switch path based on a theoretical resonance inductance and a voltage that are applied to the resonant inductor; in response to the value of the boosting current of the ARCPI being less than the threshold, determine a second boosting time in the auxiliary switch path based on a look-up table; determine a boosting time in the auxiliary switch path based on the first boosting time and the second boosting time; and control the boosting current of the ARCPI based on the boosting time in the auxiliary switch path.

According to some embodiments of the present disclosure, a method for an auxiliary device of an ARCPI to control boosting current of the ARCPI is provided. The auxiliary device may include an auxiliary switch path. The method may include a processor of the auxiliary device obtaining a value of boosting current of the ARCPI; in response to the value of the boosting current of the ARCPI being less than the threshold, the processor determining the boosting time in the auxiliary switch path based on a look-up table; and the processor controlling the boosting current of the ARCPI based on the boosting time in the auxiliary switch path.

FIG. 1 (a) shows a schematic diagram of one-phase auxiliary resonant commutated pole inverter (ARCPI) equivalent circuit 100 (a). The circuit includes a direct current (DC) charging power supply 110. The circuit 100 (a) includes an auxiliary switch path that uses a resonant inductor $L_r$ with two insulated-gate bipolar transistors (IGBTs) $S_{a1}$ and $S_{a2}$ serving as auxiliary switches that form a bi-directional switch configuration. The circuit 100 (a) includes another two IGBTs $S_1$ and $S_2$ that serve as main switches. Each of the main switches $S_1$ and $S_2$ is paralleled with a capacitor $C_1$ and $C_2$.

FIG. 1 (b) shows a schematic diagram of one-phase ARCPI equivalent circuit 100 (b) when using a resonant inductor in series with a saturable inductor with a saturable core in an auxiliary switch path of the ARCPI. The circuit 100 (b) is similar to the circuit 100 (a) as shown in FIG. 1 (a). However, the circuit 100 (b) includes an auxiliary switch path that uses a resonant inductor $L_r$ in series with a saturable inductor $L_{sat}$ and further with two insulated-gate bipolar transistors (IGBTs) $S_{a1}$ and $S_{a2}$ serving as auxiliary switches that form a bi-directional switch configuration.

Figure 2:
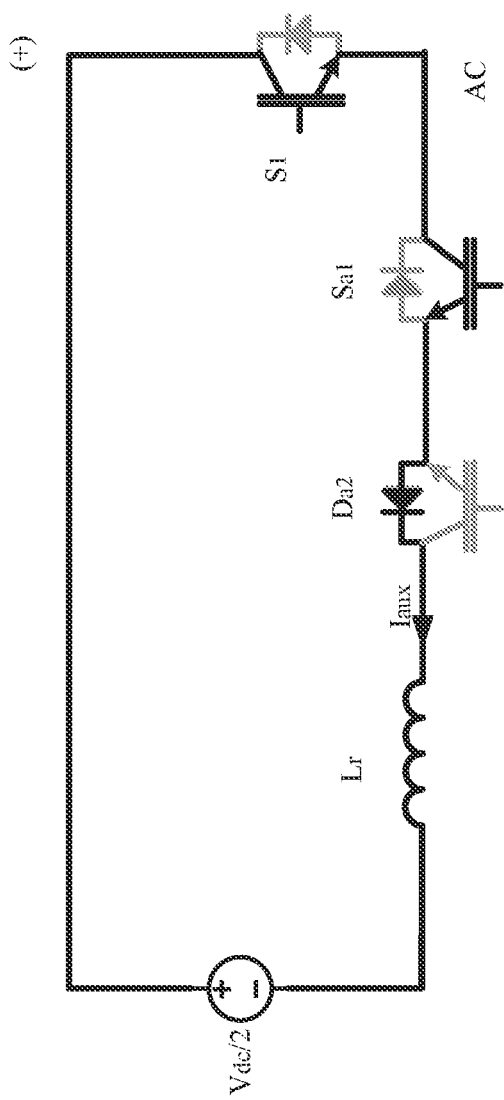
FIG. 2 (a) is a schematic diagram of an equivalent circuit for the boosting current path during the current transition from top insulated-gate bipolar transistor (IGBT) $S_1$ to bottom IGBT $S_2$ according to an exemplary embodiment of the present disclosure.
Figure 2:
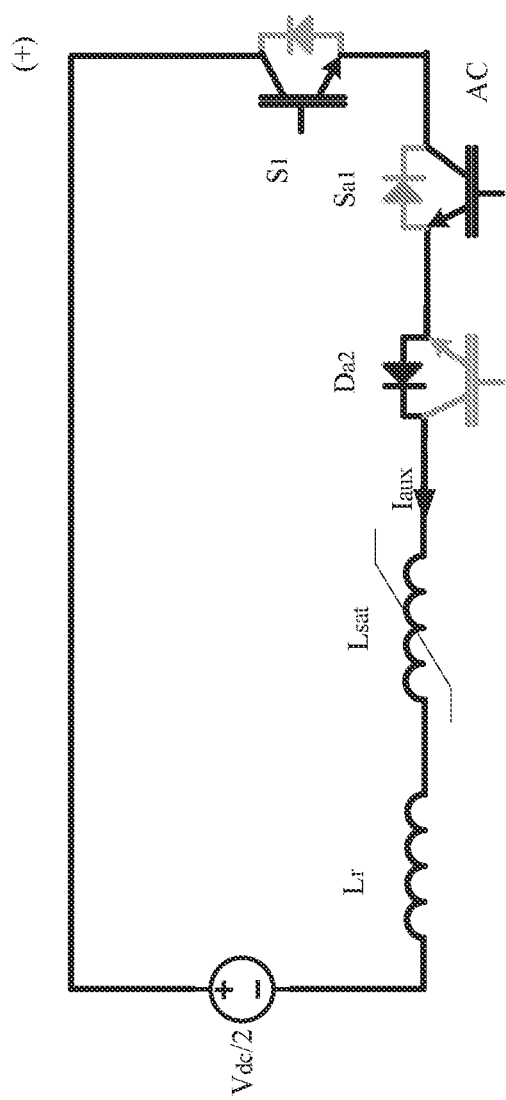

FIG. 2 (a) is a schematic diagram of an equivalent circuit for the boosting current path during the current transition from top IGBT $S_1$ to bottom IGBT $S_2$. As shown in FIG. 2 (a), in the equivalent circuit 200 (a), when the current commutates from the top main switch $S_1$ to the bottom main switch $S_2$, the auxiliary switch path is engaged by turning on $S_{a1}$. Correspondingly, the auxiliary current Tam, in the auxiliary switch path flows towards to the resonant inductor $L_r$. The time of conduction overlap between $S_{a1}$ and $S_1$ determines the boosting time $T_{boost}$ of the auxiliary current in the auxiliary switch path.

FIG. 2 (b) is a schematic diagram of an equivalent circuit for the boosting current path during the current transition from top IGBT $S_1$ to bottom IGBT $S_2$ when using a resonant inductor in series with a saturable inductor with a saturable core. The equivalent circuit 200 (b) as shown in FIG. 2 (b) is similar to the circuit 200 (a) as shown in FIG. 2 (a), except a saturable inductor $L_{sat}$ in series with the resonant inductor $L_r$ in the auxiliary switch path. The advantages of using the saturable inductor $L_{sat}$ have been introduced above.

Figure 3:
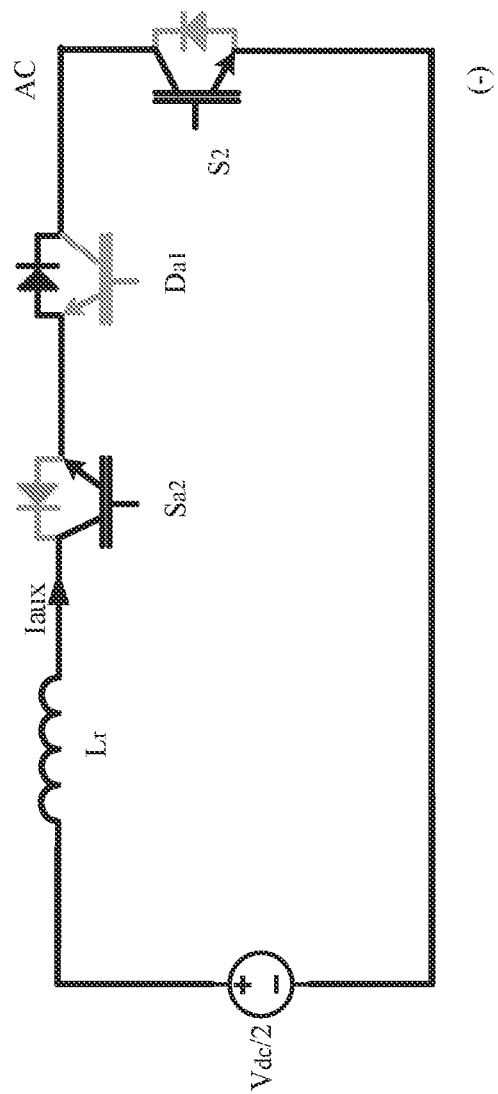
FIG. 3 (a) is a schematic diagram of an equivalent circuit for the boosting current path during the current transition from bottom IGBT $S_2$ to top IGBT $S_1$ according to an exemplary embodiment of the present disclosure.
Figure 3:
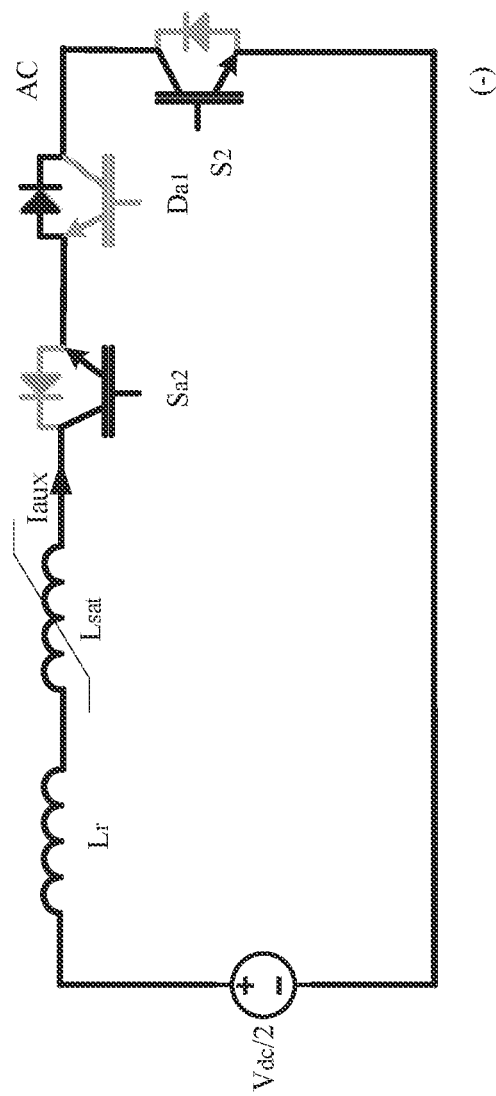

FIG. 3 (a) is a schematic diagram of an equivalent circuit for the boosting current path during the current transition from bottom IGBT $S_2$ to top IGBT $S_1$. As shown in FIG. 3 (a), in the equivalent circuit 300 (a), when the current commutates from the bottom main switch $S_2$ to the top main switch $S_1$, the auxiliary switch path is engaged by turning on $S_{a2}$. Correspondingly, the auxiliary current $I_{aux}$ in the auxiliary switch path flows away from the resonant inductor $L_r$. Similarly, the time of conduction overlap between $S_{a2}$ and $S_2$ determines the boosting time $T_{boost}$ of the auxiliary current in the auxiliary switch path.

FIG. 3 (b) is a schematic diagram of an equivalent circuit for the boosting current path during the current transition from top IGBT $S_1$ to bottom IGBT $S_2$ when using a resonant inductor in series with a saturable inductor with a saturable core. The equivalent circuit 300 (b) as shown in FIG. 3 (b) is similar to the circuit 300 (a) as shown in FIG. 3 (a), except a saturable inductor $L_{sat}$ in series with the resonant inductor $L_r$ in the auxiliary switch path. The advantages of using the saturable inductor $L_{sat}$ have been introduced above.

Generally, the boosting time $T_{boost}$ for the circuit 100 (a) shown in FIG. 1 (a), the circuit 200 (a) shown in FIG. 2 (a) and the circuit 300 (a) shown in FIG. 3 (a) is governed by the following equation:

$$\frac{Vdc}{2} = L_r \frac{\Delta I}{\Delta t} = L_r \frac{Iboost}{Tboost}, \qquad \text{Equation 1}$$

where, $V_{dc}$ represents the DC bus voltage; $L_r$ represents the resonance inductance of the resonant inductor $L_r$; $T_{boost}$ represents the boosting time of the auxiliary current in the auxiliary switch path; and $I_{boost}$ represents the boosting current of the auxiliary current in the auxiliary switch path.

In applications where only the resonant inductor $L_r$ is used in the auxiliary switch path, the resonance inductance $L_r$ used in Equation 1 is constant. In these applications, the calculation of the boosting time $T_{boost}$ is straightforward.

The calculation of the boosting time $T_{boost}$ for the circuit 100 (b) shown in FIG. 1 (b), the circuit 200 (b) shown in FIG. 2 (b) and the circuit 300 (b) shown in FIG. 3 (b) is also governed by Equation 1. However, $L_r$ used in Equation 1 under that circumstance represents a sum of the resonance inductance of the resonant inductor $L_r$ and the inductance of the saturable inductor $L_{sat}$. In other words, $L_r$ used in Equation 1 under that circumstance represents the resonance inductance in the auxiliary switch path.

In applications where the resonant inductor $L_r$ and the saturable inductor $L_{sat}$ are used in the auxiliary switch path, the $L_r$, representing the resonance inductance of the resonant inductor $L_r$ and the inductance of the saturable inductor $L_{sat}$, used in Equation 1 varies over the current in the auxiliary switch path. This is because the saturable inductor $L_{sat}$ uses a saturable core and its inductance depends on the current. Thus, the inductance of the saturable inductor $L_{sat}$ may be more precisely expressed as $L_{sat}(i)$ in these applications.

As it can be seen from Equation 1, a control of the boosting current $I_{boost}$ is performed by calculating the boosting time $T_{boost}$ of the auxiliary current in the auxiliary switch path based on solely on the resonance inductance and voltage applied to the auxiliary switch path. Thus, such control of the boosting current $I_{boost}$ may easily cause errors when the inductance in the auxiliary switch path varies over the current.

Figure 4:
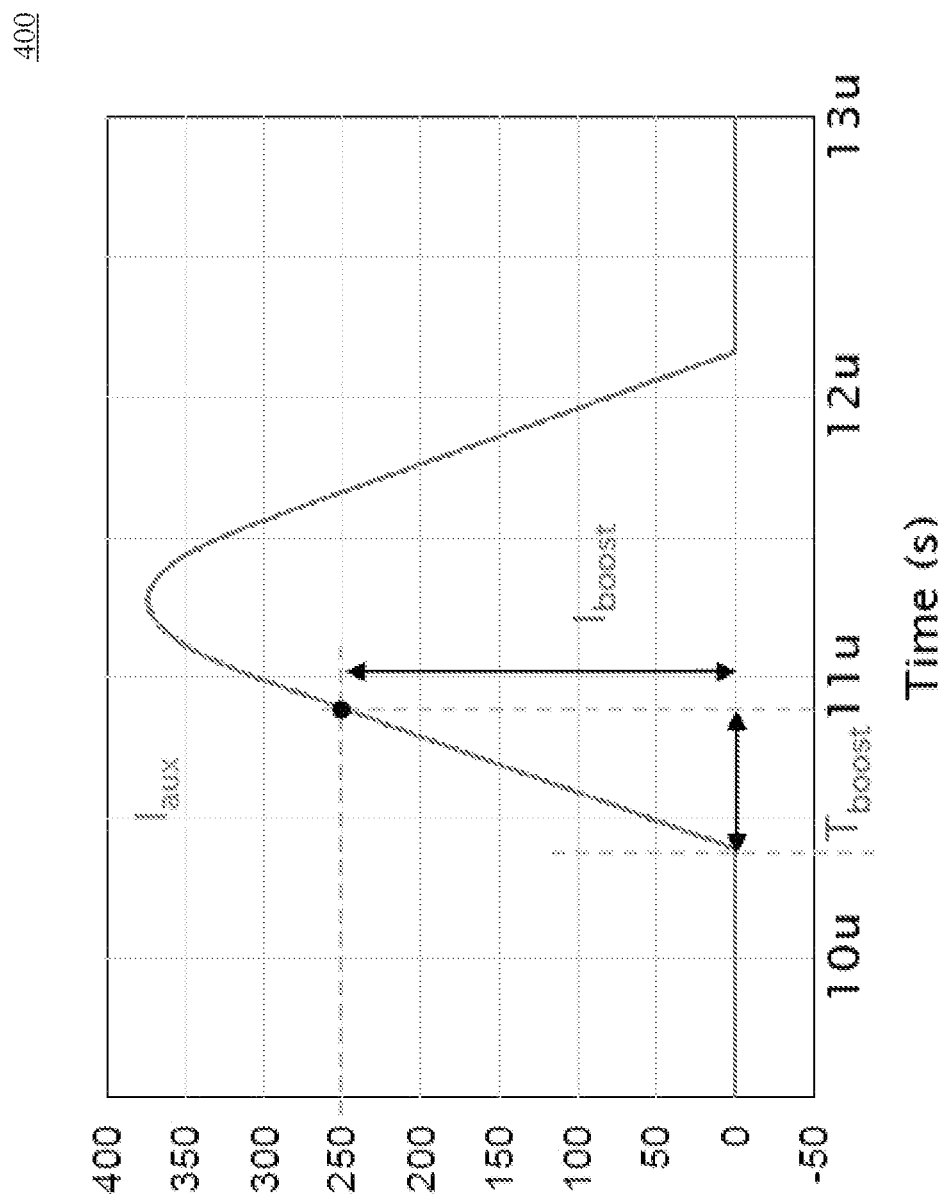
FIG. 4 is a schematic diagram of theoretical current ($I_{aux}$) across an auxiliary switch path of the ARCPI according to an equation according to an exemplary embodiment of the present disclosure.

FIG. 4 is a schematic diagram of theoretical current Lux across an auxiliary switch path of the ARCPI according to an equation, for example, Equation 1. As shown in the schematic diagram 400 of FIG. 4, the boosting current $I_{boost}$ is given by an interval of time $T_{boost}$ of the auxiliary current in the auxiliary switch path of the ARCPI.

Figure 5:
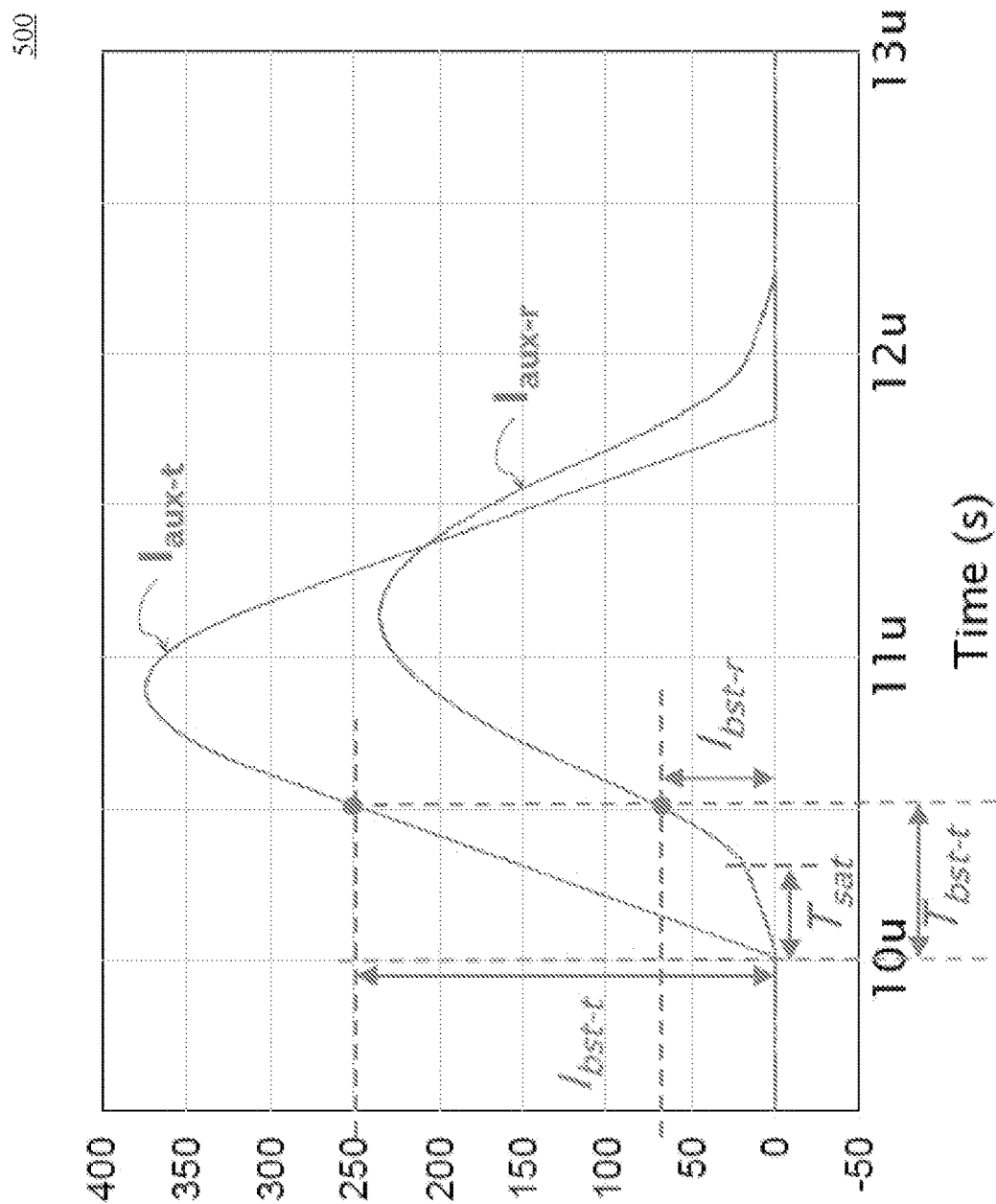
FIG. 5 is a schematic diagram of theoretical auxiliary current ($I_{aux-t}$) and real auxiliary current ($I_{aux-r}$) across an auxiliary switch path of the ARCPI when using a resonant inductor $L_r'$ composed of a saturable inductor $L_{sat}$ with a saturable core effectively in series with an air core inductor $L_r$ according to an exemplary embodiment of the present disclosure.

FIG. 5 is a schematic diagram of theoretical auxiliary current ($I_{aux\text{-}t}$) and real current ($I_{aux\text{-}r}$) across an auxiliary switch path of the ARCPI when using a resonant inductor $L_r$' composed of a saturable inductor $L_{sat}$ with a saturable core effectively in series with an air core inductor $L_r$. Such that, $L_r'=L_r+L_{sat}$. When $L_{sat}$ saturates its inductance is near 0 Henries (i.e., $L_{sat}\sim 0$). As shown in the schematic diagram 500 of FIG. 5, there is an obvious difference between the auxiliary current in the auxiliary switch path ($I_{aux\text{-}t}$) that is calculated based on $L_r$ in Equation 1 and the auxiliary current in the auxiliary switch path ($I_{aux\text{-}r}$) that is measured while using the saturable inductor in the auxiliary switch path (effectively using $L_r$'). For example, the first portion of the actual (measured) auxiliary current ($I_{aux-r}$), compared with the first portion of the theoretical (calculated) auxiliary current ($I_{aux-t}$), has a much lower slope, which is given by the saturable inductor portion of the inductor $L_r'$ before the saturation. The portion of the theoretical (calculated) auxiliary current ($I_{aux-t}$) after a so-called time $T_{bst-t}$ has a much larger slope than that of the actual (measured) auxiliary current ($I_{aux-r}$) after a so-called time $T_{sat}$. $T_{bst-t}$ is given by the inductance $L_r$ used in Equation 1 after the saturation, whereas $T_{sat}$ is given based on the real nature of resonant inductor $L_r'$ with the saturable inductor $L_{sat}$ used in the auxiliary switch path.

As also shown in FIG. 5, the theoretical (calculated) boosting current ($I_{bst-t}$) of the auxiliary current ($I_{aux-t}$) is much larger than the real (measured) boosting current ($I_{bst-r}$) of the auxiliary current ($I_{aux-r}$). The theoretical (calculated) boosting current ($I_{bst-t}$) and the real (measured) boosting current ($I_{bst-r}$) are substantially different after a given interval of time $T_{bst-t}$. This is due to the different current slopes experienced when using the saturable inductor $L_r'$. It is therefore can be seen, if only Equation 1 is used to determine the boosting time of the auxiliary current in the auxiliary switch path, an error in determining the boosting current is significantly large.

According to an exemplary embodiment of the present disclosure, an extension of the boosting time by a fixed value may be used. For example, the fixed value may be a value of $T_{sat}$, which is the value where the actual (measured) auxiliary current ($I_{aux-r}$) slope starts to increase. This extension of the boosting time of the theoretical (calculated) auxiliary current ($I_{aux-t}$) gives a much better approximation of the auxiliary current in the auxiliary switch path, and thus, there may be a much better match between the theoretical (calculated) auxiliary current ($I_{aux-t}$) and the real (measured) auxiliary current ($I_{aux-r}$) than what is shown in the schematic diagram 500 of FIG. 5.

Figure 6:
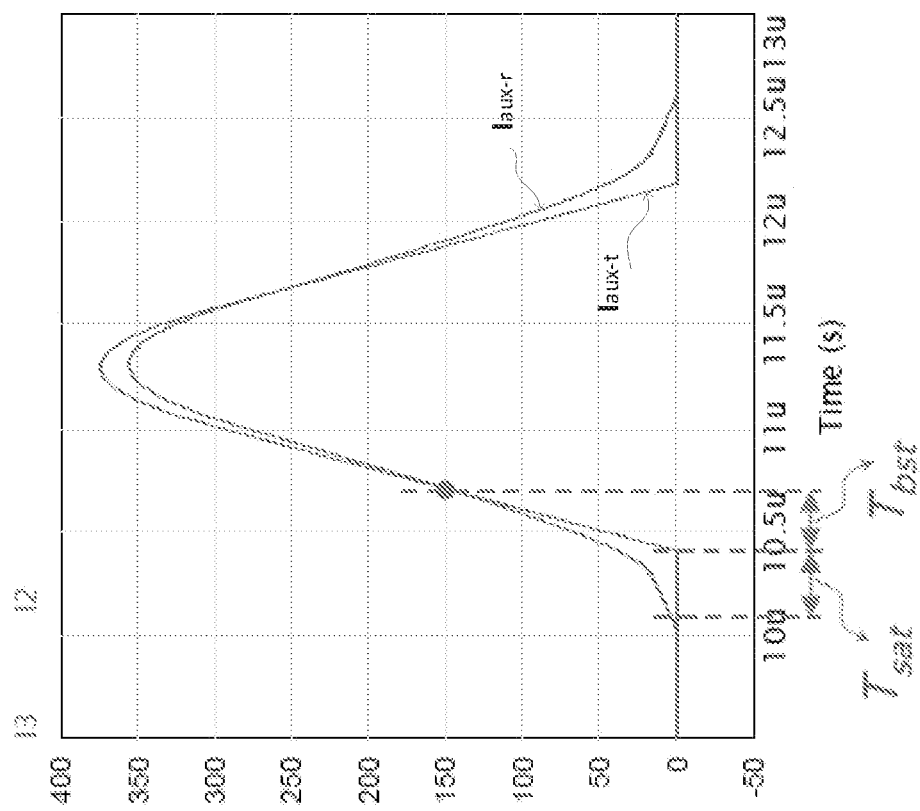
FIG. 6 (a) is a schematic diagram of theoretical auxiliary current ($I_{aux-t}$) and real auxiliary current ($I_{aux-r}$), describing the effect of correction time Tsar, across an auxiliary switch path of the ARCPI when using a resonant inductor $L_r'$ with a saturable core according to an exemplary embodiment of the present disclosure.
Figure 6:
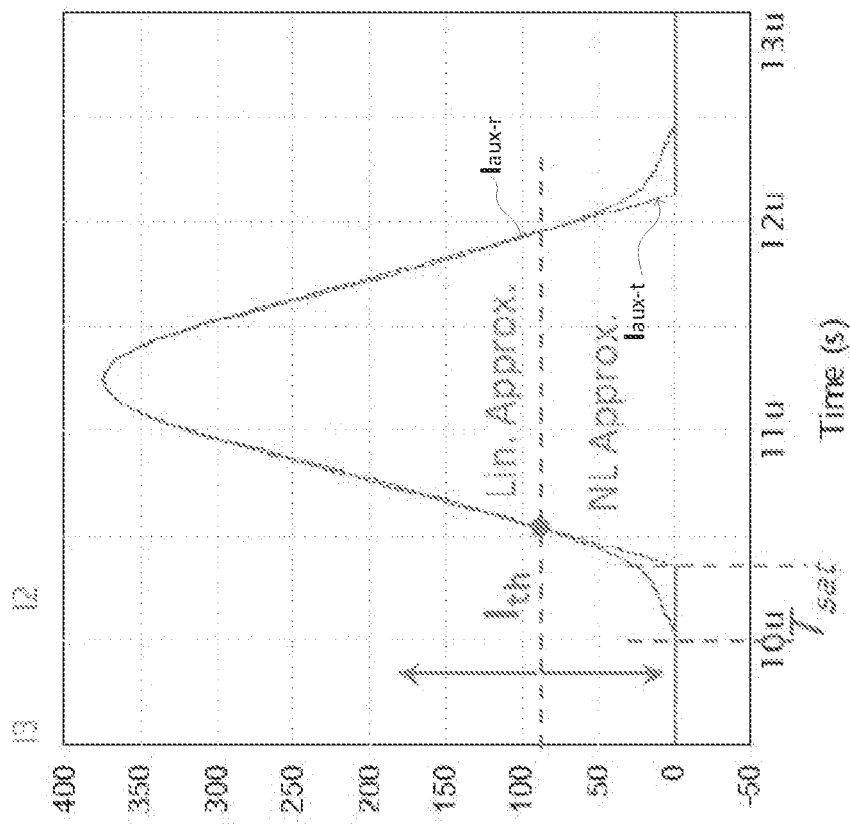

FIG. 6 (a) shows a schematic diagram of theoretical auxiliary current ($I_{aux-t}$) and real auxiliary current ($I_{aux-r}$), describing the effect of correction time $T_{sat}$, across an auxiliary switch path of the ARCPI when using a resonant inductor $L_r'$ with a saturable core. As shown in the schematic diagram 600 (a) of FIG. 6 (a), when the boosting time of the theoretical (calculated) auxiliary current ($I_{aux-t}$) has been extended by $T_{sat}$, the theoretical (calculated) auxiliary current ($I_{aux-t}$) matches better with the real (measured) auxiliary current ($I_{aux-r}$) than what is shown in the schematic diagram 500 of FIG. 5. However, as also shown in FIG. 6 (a), the slope of the theoretical (calculated) auxiliary current ($I_{aux-t}$) does not necessarily match the entire slope of the real (measured) auxiliary current ($I_{aux-r}$), for example, at the point after the saturation of the saturable inductor $L_{sat}$ is reached.

According to an exemplary embodiment of the present disclosure, a minor adjustment may be provided to correct the value of the inductance $L_r$ used in Equation 1 after the saturation of the saturable inductor $L_{sat}$ is reached. The minor adjustment may be provided based on empirical data. Alternatively and/or additionally, other data may also be used. This adjustment of value of the inductance $L_r$ used in Equation 1 gives a better approximation of the auxiliary current in the auxiliary switch path. Thus, a better match between the theoretical (calculated) auxiliary current ($I_{aux-t}$) and the real (measured) auxiliary current ($I_{aux-r}$) may be expected than what is shown in the schematic diagram 600 (a) of FIG. 6 (a).

FIG. 6 (b) is a schematic diagram of corrected theoretical auxiliary current ($I_{aux-t}$) and real auxiliary current ($I_{aux-r}$) across an auxiliary switch path of the ARCPI when using a saturable inductor with a saturable core describing transition threshold current $I_{th}$. As shown in the schematic diagram 600 (b) of FIG. 6 (b), when the value of the inductance $L_r$ used in Equation 1 is adjusted to decrease by approximately 10%, and at the same time, the boosting time of the theoretical (calculated) auxiliary current ($I_{aux-t}$) has been extended by $T_{sat}$, the theoretical (calculated) auxiliary current ($I_{aux-t}$) matches better with the real (measured) auxiliary current ($I_{aux-r}$) than what is shown in the schematic diagram 600 (a) of FIG. 6 (a). However, as also shown in FIG. 6 (b), even with the extension of the boosting time by $T_{sat}$ and correction of the inductance $L_r$ used in Equation 1, there is still a significant miss-match between the corrected theoretical auxiliary current ($I_{aux-t}$) and real auxiliary current ($I_{aux-r}$) for a current level below a threshold point, i.e., a threshold current $I_{th}$, as shown in the schematic diagram 600 (b) of FIG. 6 (b).

The threshold current $I_{th}$ identifies a threshold current level, below which it is extremely difficult to predict how the real (measured) auxiliary current ($I_{aux-r}$) is going to be during a specific time span due to the non-linearity of the saturable inductor $L_{sat}$, for example, as shown in circuit 100 (b) of FIG. 1 (b). Therefore, another approximation of the auxiliary current in the auxiliary switch path is desired to have a better match between the slopes of the theoretical (calculated) auxiliary current ($I_{aux-t}$) and the real (measured) auxiliary current ($I_{aux-r}$), when the auxiliary current in the auxiliary switch path is lower than the threshold current $I_{th}$.

According to an exemplary embodiment of the present disclosure, a look-up table may be used to determine the auxiliary current in the auxiliary switch path, namely the boosting current $I_{boost}$, during a specific time span, namely the boosting time, when the auxiliary current in the auxiliary switch path is lower than the threshold current $I_{th}$. In other words, the use of Equation 1 to make a linear approximation of the auxiliary current in the auxiliary switch path is now replaced with the use of the look-up table. For example, a look-up table may include a relationship between boosting current $I_{boost}$ and boosting time $T_{boost}$ when the auxiliary current in the auxiliary switch path is lower than the threshold current $I_{th}$. The relationship between boosting current $I_{boost}$ and boosting time $T_{boost}$ may include at least one non-linear relationship over a time span for the auxiliary current in the auxiliary switch path of the ARCPI. Additionally and/or alternatively, the look-up table may include at least one non-linear approximation of the auxiliary current in the auxiliary switch path of the ARCPI.

Figure 7:
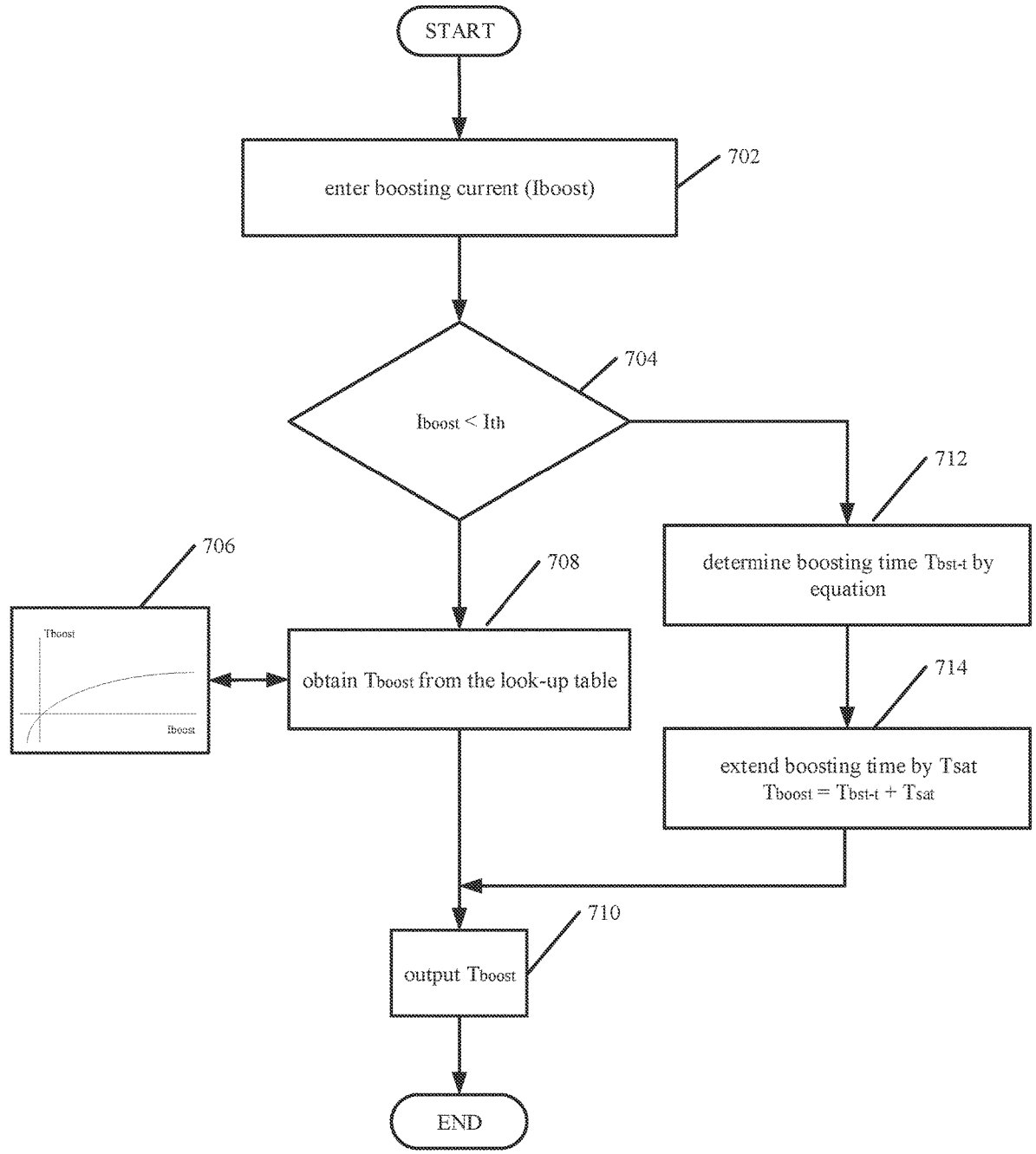
FIG. 7 is a schematic flowchart of calculating boosting time of the ARCPI according to an exemplary embodiment of the present disclosure.

FIG. 7 is a schematic flowchart of calculating boosting time of the ARCPI according to an exemplary embodiment of the present disclosure. As shown in FIG. 7, a method 700 for a process of calculating the boosting time $T_{boost}$ of the auxiliary current in the auxiliary switch path of the ARCPI that includes at least one saturable inductor may include the following steps.

At step 702, a user may enter a value of boosting current $I_{boost}$. The value of the boosting current $I_{boost}$ may be a value of desired boosting current for the auxiliary current in the auxiliary switch path of the ARCPI that includes at least one saturable inductor. Additionally and/or alternatively, other random values of boosting current $I_{boost}$ may be also given by the user or calculated by a processor.

At step 704, the entered value of the boosting current $I_{boost}$ may be compared with threshold current $I_{th}$. The threshold current $I_{th}$ identifies a current level, below which the at least one saturable inductor in the auxiliary switch path of the ARCPI behaves in a non-linear manner. The threshold current $I_{th}$ may be preset based on the nature of the at least one saturable inductor in the auxiliary switch path. Additionally and/or alternatively, the threshold current $I_{th}$ may be given in real time while running the method 700. A result generated at step 704 may include that the entered value of the boosting current $I_{boost}$ is larger than the threshold current $I_{th}$, or the entered value of the boosting current $I_{boost}$ is less than the threshold current $I_{th}$.

The term "real time" refers to at least one of the time of occurrence of the associated events, the time of measurement and collection of predetermined data, the time to process the data, and the time of a system response to the events and the environment. In the embodiments described herein, these activities and events occur substantially instantaneously.

At step 706, if the entered value of the boosting current $I_{boost}$ is less than the threshold current $I_{th}$, a look-up table may be provided for a determination of the boosting time $T_{boost}$ of the auxiliary current in the auxiliary switch path of the ARCPI over a specific time span. As shown at step 706 of FIG. 7, the look-up table may include a relationship between boosting current $I_{boost}$ and boosting time $T_{boost}$ of the auxiliary current in the auxiliary switch path of the ARCPI. The relationship between boosting current $I_{boost}$ and boosting time $T_{boost}$ may include at least one non-linear relationship over a time span for the auxiliary current in the auxiliary switch path. Additionally and/or alternatively, the look-up table may include at least one non-linear approximation of auxiliary current in the auxiliary switch path of the ARCPI.

At step 708, if the entered value of the boosting current $I_{boost}$ is less than the threshold current $I_{th}$, the look-up table may be provided to a processor for executing the process or be obtained by the processor for executing the process. Then, the look-up table is used to determine the boosting time $T_{boost}$ of the auxiliary current in the auxiliary switch path of the ARCPI over a specific time span.

At step 712, if the entered value of the boosting current $I_{boost}$ is larger than the threshold current $I_{th}$, an equation may be used to calculate the theoretical (calculated) boosting time $T_{bst-t}$ of the auxiliary current in the auxiliary switch path. The equation may be Equation 1, as described above. Additionally and/or alternatively, other variations of Equation 1 may be also used.

At step 714, which follows step 712, the theoretical (calculated) boosting time $T_{bst-t}$ of the auxiliary current in the auxiliary switch path may be extended by a period of time $T_{sat}$ for a better match between the theoretical (calculated) auxiliary current and the real (measured) auxiliary current in the auxiliary switch path. Accordingly, the boosting time of the auxiliary current in the auxiliary switch path may be a sum of the theoretical (calculated) boosting time $T_{bst-t}$ and the extension of time $T_{sat}$.

At step 710, the determined boosting time $T_{boost}$ of the auxiliary current in the auxiliary switch path of the ARCPI, or the calculated and extended boosting time $T_{boost}$ of the auxiliary current in the auxiliary switch path of the ARCPI may be output by the processor for executing the process.

Based on the process shown in FIG. 7 and described as above, an output from the process is a boosting time $T_{boost}$, with which corresponding boosting current $I_{boost}$ may be determined, and accordingly, a better slope of the auxiliary current in the auxiliary switch path of the ARCPI may be formed or determined. This means, the formed or determined auxiliary current in the auxiliary switch path of the ARCPI matches better with the real (measured) auxiliary current ($I_{aux-r}$). The process solves the issue of inaccuracy on the boosting current of the auxiliary current in the auxiliary switch path of the ARCPI by using a saturable inductor in the auxiliary switch path. At the same time, the advantages of using a saturable inductor in the auxiliary switch path of the ARCPI to guarantee a zero voltage switching may be maximized.

Figure 8:
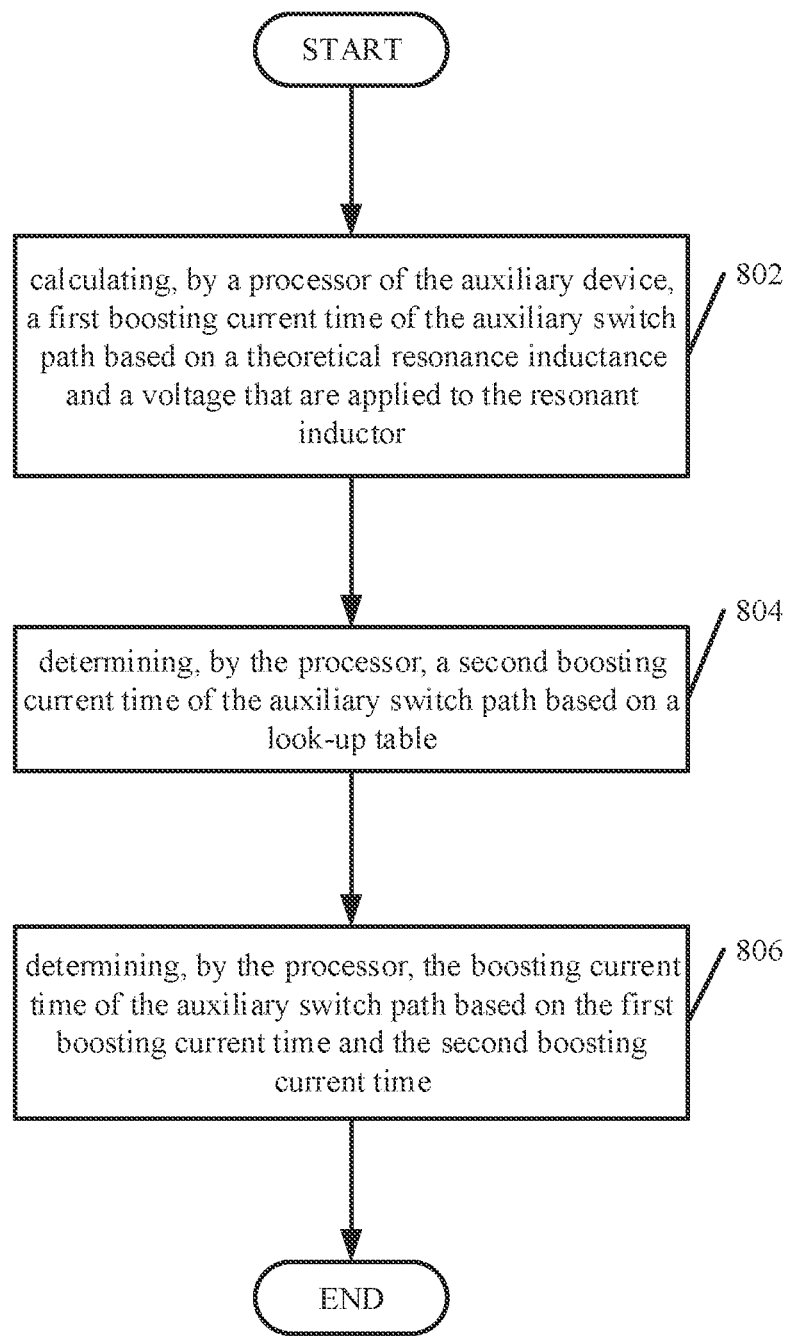
FIG. 8 is a schematic flowchart of determining boosting time of the ARCPI according to another exemplary embodiment of the present disclosure.

According to an exemplary embodiment of the present disclosure, FIG. 8 is a schematic flowchart of determining boosting time of the ARCPI. As shown in FIG. 8, a method 800 for an auxiliary device of an ARCPI to determine a boosting time of the ARCPI is provided. The auxiliary device includes an auxiliary switch path that uses a resonant inductor and at least one saturable inductor.

At step 802, a processor of the auxiliary device calculates a first boosting time in the auxiliary switch path based on a theoretical resonance inductance and a voltage that are applied to the resonant inductor in the auxiliary switch.

According to an exemplary embodiment of the present disclosure, the processor obtains a value of the boosting current of the auxiliary current in the auxiliary switch path of the ARCPI. The value of the boosting current may be desired by a user for the auxiliary current in the auxiliary switch path of the ARCPI. Additionally and/or alternatively, other random values of the boosting current may also be given by the user.

According to an exemplary embodiment of the present disclosure, if the value of the boosting current of the ARCPI is larger than a threshold, step 802 is conducted, i.e., the processor calculating the first boosting time in the auxiliary switch path based on the theoretical resonance inductance and the voltage that are applied to the resonant inductor in the auxiliary switch path of the ARCPI. The threshold may identify a current level, below which the at least one saturable inductor in the auxiliary switch path of the ARCPI shows non-linear characteristics. The threshold may be preset based on the nature of the at least one saturable inductor. Additionally and/or alternatively, the threshold may be given in real time while running the method 800.

According to an exemplary embodiment of the present disclosure, if the value of the boosting current of the ARCPI is larger than the threshold, step 802 may further include the processor determining the first boosting time in the auxiliary switch path by summing the boosting time in the auxiliary switch path calculated based on the theoretical resonance inductance and the voltage that are applied to the resonant inductor in the auxiliary switch path of the ARCPI and an extension of a time. For example, the time extended is a point of time at which the at least one saturable inductor reaches a saturation.

According to an exemplary embodiment of the present disclosure, if the value of the boosting current of the ARCPI is larger than the threshold, the processor at step 802 may calculate the first boosting time in the auxiliary switch path based on the theoretical resonance inductance and the voltage that are applied to the resonant inductor in the auxiliary switch according to Equation 1 as follows:

$$\frac{Vdc}{2} = L_r \frac{\Delta I}{\Delta t} = L_r \frac{Iboost}{Tboost},$$

wherein $V_{dc}$ represents the voltage, the voltage may be direct current (DC) bus voltage, $L_r$ represents the resonance inductance in the auxiliary switch path, $T_{boost}$ represents the first boosting time in the auxiliary switch path, and $I_{boost}$ represents first boosting current corresponding to the first boosting time in the auxiliary switch path.

At step 804, the processor of the auxiliary device determines a second boosting time in the auxiliary switch path based on a look-up table.

According to an exemplary embodiment of the present disclosure, if the value of the boosting current of the ARCPI is less than a threshold, step 804 is conducted, i.e., the processor determining the second boosting time in the auxiliary switch path based on the look-up table.

According to an exemplary embodiment of the present disclosure, the look-up table may include a relationship between boosting current $I_{boost}$ and boosting time $T_{boost}$ of the auxiliary current in the auxiliary switch path of the ARCPI. The relationship between boosting current $I_{boost}$ and boosting time $T_{boost}$ may include at least one non-linear relationship over a time span for the auxiliary current in the auxiliary switch path. Additionally and/or alternatively, the look-up table may include at least one non-linear approximation of auxiliary current in the auxiliary switch path of the ARCPI.

For example, the at least one non-linear approximation may be based on curve fitting equations that define a relation between boost current and boost time in the auxiliary switch path. Additionally and/or alternatively, other data may be also used for defining the at least one non-linear approximation of the auxiliary current in the auxiliary switch path of the ARCPI.

At step 806, the processor determines the boosting time in the auxiliary switch path based on the first boosting time calculated at step 802 and the second boosting time determined at step 804.

According to an exemplary embodiment of the present disclosure, if the value of the boosting current of the ARCPI is larger than the threshold, the processor determines that the boosting time in the auxiliary switch path equals to the first boosting time in the auxiliary switch path calculated at step 802 as shown in FIG. 8; and if the value of the boosting current of the ARCPI is less than the threshold, the processor determines that the boosting time in the auxiliary switch path equals to the second boosting time in the auxiliary switch path determined at step 804 as shown in FIG. 8.

According to an exemplary embodiment of the present disclosure, the processor controls boosting current of the auxiliary current in the auxiliary switch path of the ARCPI based on the boosting time of the auxiliary current in the auxiliary switch path determined at step 806 as shown in FIG. 8.

According to an exemplary embodiment of the present disclosure, the processor corrects the boosting time of the auxiliary current in the auxiliary switch path determined at step 806 in each switch cycle in the auxiliary switch path based on a measured output of the auxiliary switch path.

The method 800 for the auxiliary device of the ARCPI determines a more accurate boosting time of the auxiliary current in the auxiliary switch path of the ARCPI. Instead of merely using a general equation, for example, Equation 1 and/or a minor adjustment of inductance based on empirical data and/or an extension of time upon a saturation of the at least one saturable inductor used in the auxiliary switch path of the ARCPI, the method 800 also uses a look-up table to make non-linear approximation of the auxiliary current in the auxiliary switch path of the ARCPI. As such, the impact on the accuracy of the auxiliary current in the auxiliary switch path of the ARCPI, especially on the boosting current of the auxiliary current, by the use of the at least one saturable inductor in the auxiliary switch path is minimized.

Figure 9:
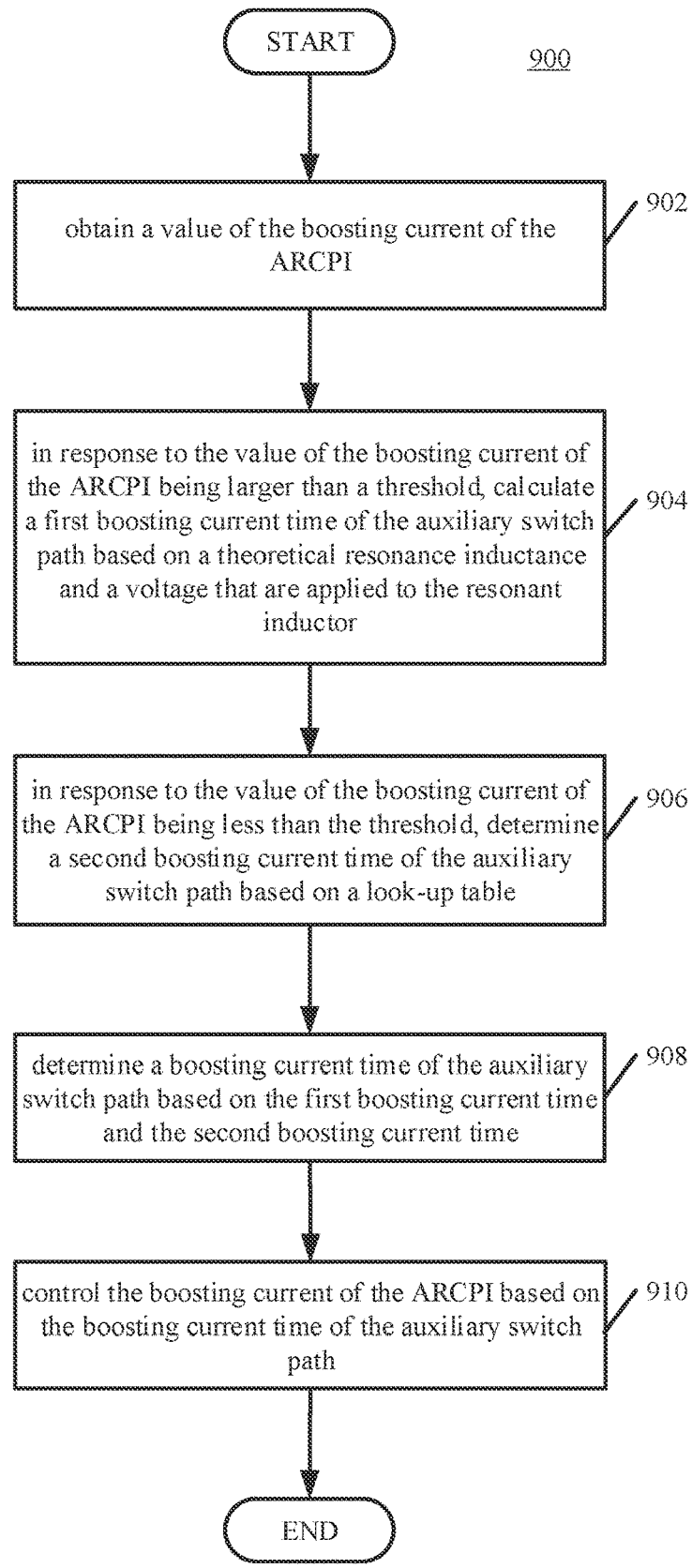
FIG. 9 is a schematic flowchart of controlling boosting current of the ARCPI according to another exemplary embodiment of the present disclosure.

FIG. 9 is a schematic flowchart of controlling boosting current of the ARCPI. As shown in FIG. 9, an auxiliary device of an ARCPI for controlling boosting current of the ARCPI is provided. The auxiliary device includes an auxiliary switch path that uses a resonant inductor and at least one saturable inductor. Further, the auxiliary device includes a processor, and the processor of the auxiliary device is configured to perform a method 900.

At step 902, the processor of the auxiliary device obtains a value of the boosting current of the ARCPI. This value may be input by a user. This value may be desired by the user for the boosting current of the auxiliary current in the auxiliary switch path of the ARCPI. Additionally and/or alternatively, other values of the boosting current may also be given by the user.

At step 904, the processor of the auxiliary device compares the obtained value of the boosting current of the ARCPI with a threshold. If the obtained value of the boosting current of the ARCPI is larger than the threshold, the processor of the auxiliary device calculates a first boosting time in the auxiliary switch path based on a theoretical resonance inductance and a voltage that are applied to the resonant inductor.

According to an exemplary embodiment of the present disclosure, the threshold may be a threshold value of the auxiliary current in the auxiliary switch path of the ARCPI. The threshold value of the auxiliary current in the auxiliary switch path of the ARCPI may identify an auxiliary current level, below which the auxiliary current in the auxiliary switch path of the ARCPI behaves in a non-linear manner. For example, below the auxiliary current level identified by the threshold value of the auxiliary current in the auxiliary switch path of the ARCPI, there is a non-linear relationship between the boosting current and the boosting time of the auxiliary current in the auxiliary switch path of the ARCPI. The threshold value of the auxiliary current in the auxiliary switch path of the ARCPI may be preset based on the nature of the at least one saturable inductor. Additionally and/or alternatively, the threshold value may be given in real time while running the method 900.

According to an exemplary embodiment of the present disclosure, if the obtained value of the boosting current of the ARCPI is larger than the threshold, the processor of the auxiliary device calculates the first boosting time in the auxiliary switch path at step 904 may include the processor of the auxiliary device calculating the first boosting time by summing the boosting time in the auxiliary switch path calculated based on the theoretical resonance inductance and the voltage that are applied to the resonant inductor in the auxiliary switch path of the ARCPI and an extension of a time. For example, the time extended is a point of time at which the at least one saturable inductor reaches a saturation.

According to an exemplary embodiment of the present disclosure, if the obtained value of the boosting current of the ARCPI is larger than the threshold, the processor of the auxiliary device calculates the first boosting time in the auxiliary switch path at step 904 may be according to Equation 1 as follows:

$$\frac{Vdc}{2} = L_r \frac{\Delta I}{\Delta t} = L_r \frac{Iboost}{Tboost},$$

wherein $V_{dc}$ represents the voltage, the voltage may be direct current (DC) bus voltage, $L_r$ represents the resonance inductance in the auxiliary switch path, $T_{boost}$ represents the first boosting time in the auxiliary switch path, and $I_{boost}$ represents first boosting current corresponding to the first boosting time in the auxiliary switch path.

At step 906, if the value of the boosting current of the ARCPI is less than the threshold, the processor of the auxiliary device determines a second boosting time in the auxiliary switch path based on a look-up table.

According to an exemplary embodiment of the present disclosure, the look-up table may be pre-stored in a memory of the auxiliary device. The look-up table may be pre-stored in a remote server or a remote cloud, to which the auxiliary device has an access. Additionally and/or alternatively, one or more look-up tables may be pre-stored in the memory of the auxiliary device, in the remote server, or in the remote cloud. In scenarios where the one or more look-up tables are pre-stored in the remote server or in the remote cloud, the auxiliary device communicates with the remote server or the remote cloud and informs the remote server or the remote cloud as to which look-up table should be input to the auxiliary device.

According to an exemplary embodiment of the present disclosure, the look-up table may include a relationship between boosting current $I_{boost}$ and boosting time $T_{boost}$ of the auxiliary current in the auxiliary switch path of the ARCPI. The relationship between boosting current $I_{boost}$ and boosting time $T_{boost}$ may include at least one non-linear relationship over a time span for the auxiliary current in the auxiliary switch path. Additionally and/or alternatively, the look-up table may include at least one non-linear approximation of auxiliary current in the auxiliary switch path of the ARCPI.

For example, the at least one non-linear approximation may be based on curve fitting equations that define a relation between boost current and boost time of the auxiliary current in the auxiliary switch path. Additionally and/or alternatively, other data may be also used for defining the at least one non-linear approximation of the auxiliary current in the auxiliary switch path of the ARCPI.

At step 908, the processor of the auxiliary device determines a boosting time in the auxiliary path based on the first boosting time and the second boosting time. For example, if the value of the boosting current of the ARCPI is larger than the threshold, the processor of the auxiliary device determines that the boosting time in the auxiliary switch path equals to the first boosting time in the auxiliary switch path. For example, if the value of the boosting current of the ARCPI is less than the threshold, the processor of the auxiliary device determines that the boosting time in the auxiliary switch path equals to the second boosting time in the auxiliary switch path.

As such, the boosting time in the auxiliary path is determined. The determined boosting time is more accurate than the one determined merely by an equation for boosting time and boosting current and/or by an adjustment based on empirical data and/or by an extension of boosting time. The determined boosting time is especially accurate during a time span where the boosting time and the boosting current are in a non-linear relationship due to the at least one saturable inductor used in the auxiliary switch path.

At step 910, the processor of the auxiliary device controls the boosting current of the auxiliary current in the auxiliary switch path of the ARCPI based on the determined boosting time in the auxiliary switch path determined at step 908.

Through applying the method 900, the overall graph of the determined auxiliary current in the auxiliary path using at least one saturable inductor matches better with the overall graph of the real (measured) auxiliary current in the auxiliary path using the at least one saturable inductor.

The method 900 for the auxiliary device of the ARCPI controls the boosting current of the auxiliary current in the auxiliary switch path of the ARCPI based on the boosting time of the auxiliary current. The boosting time of the auxiliary current is determined not only by Equation 1 and/or a minor adjustment of inductance based on empirical data and/or an extension of time upon a saturation of at least one saturable inductor used in the auxiliary switch path of the ARCPI, but also by a look-up table for a non-linear approximation of the auxiliary current in the auxiliary switch path of the ARCPI. As such, the impact on the accuracy of the boosting current of the auxiliary current in the auxiliary switch path of the ARCPI by the use of the at least one saturable inductor is minimized.

Figure 10:
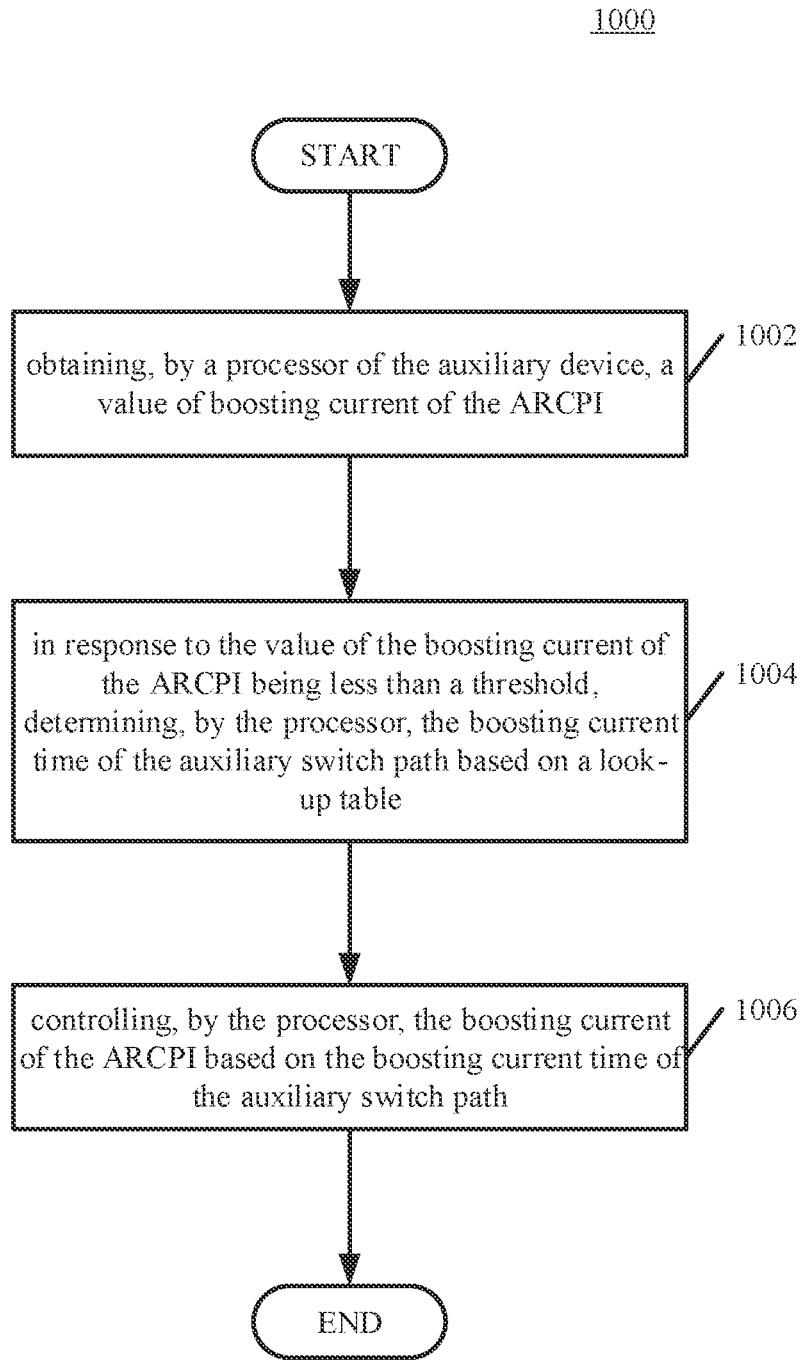
FIG. 10 is a schematic flowchart of controlling boosting current of the ARCPI according to another exemplary embodiment of the present disclosure.

FIG. 10 is a schematic flowchart of controlling boosting current of the ARCPI. As shown in FIG. 10, a method 1000 for an auxiliary device of an ARCPI to control boosting current of the ARCPI is provided. The auxiliary device may include an auxiliary switch path. The auxiliary switch path may include at least one saturable inductor.

At step 1002, a processor of the auxiliary device obtains a value of boosting current of the ARCPI. The value of the boosting current of the ARCPI may be provided by a user. The value of the boosting current of the ARCPI may be a desired value for the auxiliary current in the auxiliary switch path of the ARCPI by the user. Additionally and/or alternatively, other random values of boosting current of the ARCPI may also be given by the user.

At step 1004, the processor of the auxiliary device determines the boosting time of the auxiliary current in the auxiliary switch path based on a look-up table, if the value of the boosting current of the ARCPI is less than a threshold.

According to an exemplary embodiment of the present disclosure, the threshold may be a threshold value for the boosting current of the auxiliary current in the auxiliary switch path of the ARCPI. The threshold value may identify a boosting current level, below which the boosting current and the boosting time of the auxiliary current in the auxiliary switch path of the ARCPI may be in a non-linear relationship. In other words, if the value of the boosting current of the ARCPI is less than the threshold value, a non-linear approximation of the boosting time of the auxiliary current in the auxiliary switch path may be determined. The threshold value may be preset based on the nature of the at least one saturable inductor in the auxiliary switch path. Additionally and/or alternatively, the threshold value may be given in real time while running the method 1000.

According to an exemplary embodiment of the present disclosure, the look-up table may be pre-stored in a memory of the auxiliary device. The look-up table may be pre-stored in a remote server or a remote cloud, to which the auxiliary device has an access. Additionally and/or alternatively, one or more look-up tables may be pre-stored in the memory of the auxiliary device, in the remote server, or in the remote cloud. In scenarios where the one or more look-up tables are pre-stored in the remote server or in the remote cloud, the auxiliary device communicates with the remote server or the remote cloud and informs the remote server or the remote cloud as to which look-up table should be input to the auxiliary device.

According to an exemplary embodiment of the present disclosure, the look-up table may include a relationship between boosting current $I_{boost}$ and boosting time $T_{boost}$ of the auxiliary current in the auxiliary switch path of the ARCPI. The relationship between boosting current $I_{boost}$ and boosting time $T_{boost}$ may include at least one non-linear relationship over a time span for the auxiliary current in the auxiliary switch path. Additionally and/or alternatively, the look-up table may include at least one non-linear approximation of auxiliary current in the auxiliary switch path of the ARCPI.

For example, the at least one non-linear approximation may be based on curve fitting equations that define a relation between boost current and boost time of the auxiliary current in the auxiliary switch path. Additionally and/or alternatively, other data may be also used for defining the at least one non-linear approximation of the auxiliary current in the auxiliary switch path of the ARCPI.

At step 1006, the processor of the auxiliary device controls the boosting current of the auxiliary current in the auxiliary switch path of the ARCPI based on the boosting time in the auxiliary switch path determined at step 1004.

The method 1000 for the auxiliary device of the ARCPI controls the boosting current of the auxiliary current in the auxiliary switch path of the ARCPI based on the boosting time of the auxiliary current. The boosting time of the auxiliary current is determined based on a look-up table for a non-linear approximation of the auxiliary current in the auxiliary switch path of the ARCPI, when a given (desired) value of boosting current is less than a threshold current. As such, the impact on the accuracy of the boosting current of the auxiliary current in the auxiliary switch path of the ARCPI by the use of at least one saturable inductor in the auxiliary switch path is minimized.

Figure 11:
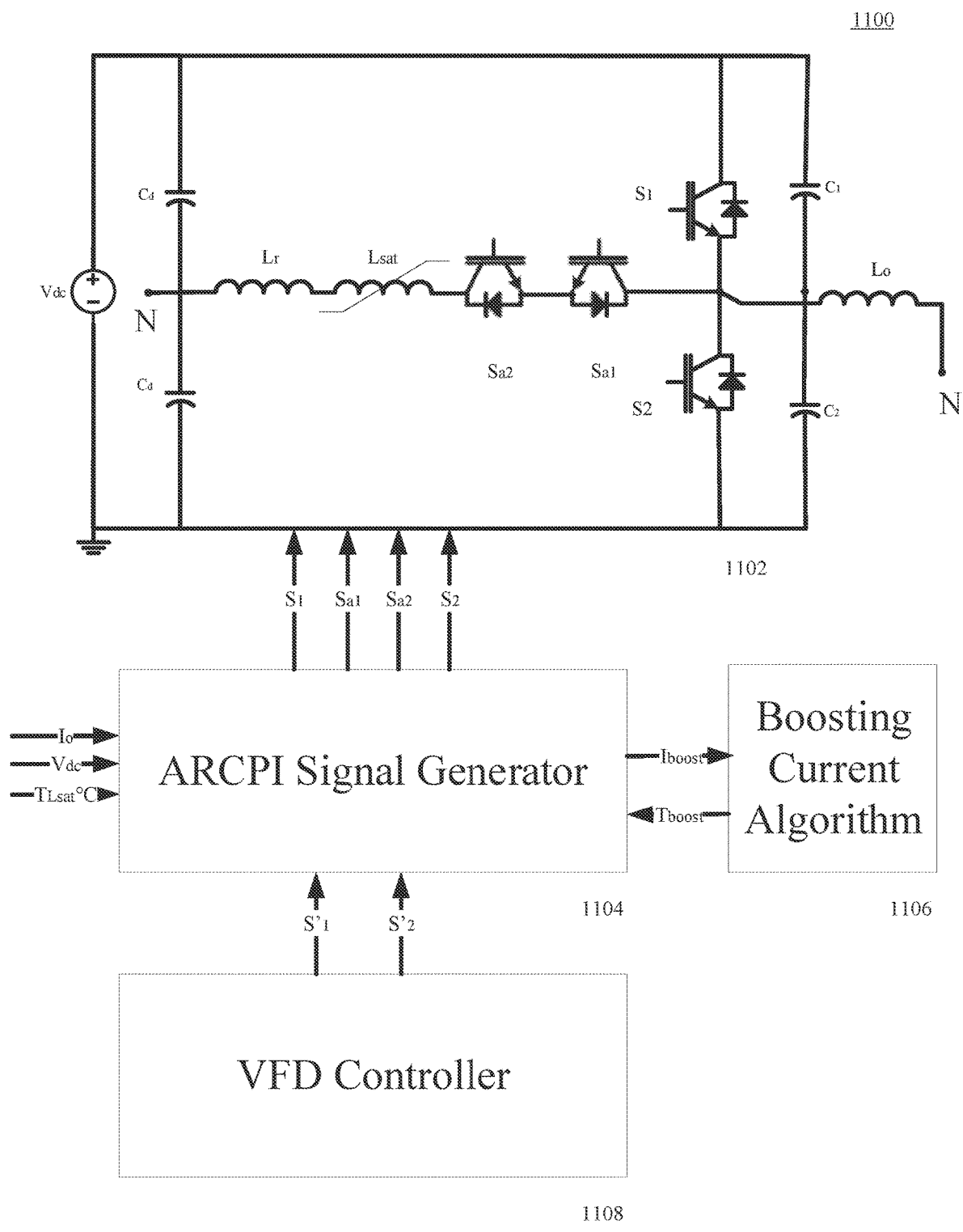
FIG. 11 is a schematic diagram of an ARCPI controller of an algorithm for controlling boosting current of the ARCPI according to an exemplary embodiment of the present disclosure.

FIG. 11 is a schematic diagram of an ARCPI controller of an algorithm for determining boosting time of the ARCPI. As shown in FIG. 11, the ARCPI controller 1100 is arranged as the followings: the ARCPI 1102 is based on a variable frequency drive (VFD) controller 1108 or any controller of an inverter, DC/AC converter or AC/DC converter, and further, based on the foregoing described methods to control the boosting current of the auxiliary current in the auxiliary switch path of the ARCPI 1102. The auxiliary switch path of the ARCPI 1102 uses a saturable inductor $L_{sat}$. Based on the foregoing described methods, this ARCPI controller 1100 corrects the boosting current by considering not only DC bus voltage, saturable inductor $L_{sat}$ temperature, empirical data, and boosting time extension, but also the non-linear relationship between the boosting current and boosting time of the auxiliary current in the auxiliary switch path of the ARCPI 1102 due to the nature of the saturable inductor $L_{sat}$.

According to an exemplary embodiment of the present disclosure, the ARCPI 1102 may include a power supply $V_{dc}$. The ARCPI 1102 may include an auxiliary switch path that uses a resonant inductor $L_r$, a saturable inductor $L_{sat}$ in series with two IGBTs $S_{a1}$ and $S_{a2}$ serving as auxiliary switches that form a bi-directional auxiliary switch configuration. The resonant inductor $L_r$, the saturable inductor $L_{sat}$ and the two IGBTs $S_{a1}$ and $S_{a2}$ may be further in series with a resonant inductor $L_o$. The ARCPI 1102 may include another two IGBTs $S_1$ and $S_2$ that serve as main switches. Each of the main switches $S_1$ and $S_2$ may be paralleled with a capacitor $C_1$ and $C_2$. Further, each of the main switches $S_1$ and $S_2$ may be in series with a capacitor $C_d$, respectively.

According to an exemplary embodiment of the present disclosure, the VFD controller 1108 may be one type of motor controller, which drives an electric motor by varying the frequency and voltage of its power supply. As shown in FIG. 11, two insulated-gate bipolar transistors (IGBTs), $S_{a1}$ and $S_{a2}$, forming a bi-directional IGBT switch device are used in the ARCPI 1102 as an inverter switch device for the VFD controller 1108. An output of the inverter switch device may be provided to the electric motor. Additionally and/or alternatively, other types of motor controller may be also applied.

The VFD controller 1108 may output two switch signals $S'_1$ and $S'_2$ for the two IGBTs, the main switches $S_1$ and $S_2$, used in the ARCPI 1102 to an ARCPI signal generator 1104 shown in FIG. 11 as inputs for the ARCPI signal generator 1104. Further, inputs for the ARCPI signal generator 1104 may include current $I_o$ for the resonant inductor $L_o$ in the ARCPI 1102, power supply $V_{dc}$ for the ARCPI 1102 and temperature information for the saturable inductor $L_{sat}$ in the ARCPI 1102. These inputs are used for determining and/or adjusting timing of a pulse trigger for the ARCPI 1102. For example, the voltage applied to the saturable inductor $L_{sat}$ and the temperature information for the saturable inductor $L_{sat}$ may be monitored by the ARCPI signal generator 1104 in order to adjust the timing of a switch for the ARCPI 1102 through $S_1$, $S_{a1}$, $S_{a2}$ or $S_2$.

According to an exemplary embodiment of the present disclosure, further inputs for the ARCPI signal generator 1104 may include boosting time determined by a boosting current algorithm 1106. For example, the ARCPI signal generator 1104 may provide a value of boosting current $I_{boost}$ to the boosting current algorithm 1106. The value may be a boosting current value desired by a user for the auxiliary current in the auxiliary switch path of the ARCPI 1102, which will be applied to an application scenario. Additionally and/or alternatively, other random values of the boosting current may also be given by the user. Based on the boosting current value as an input, the boosting current algorithm 1106 may run the methods 700 as shown in FIG. 7, 800 as shown in FIG. 8, 900 as shown in FIG. 9 or 1000 as shown in FIG. 10 described above to determine boosting time of the auxiliary current in the auxiliary switch path of the ARCPI 1102 accordingly.

For example, the boosting current algorithm 1106 first compares the input value of boosting current with a threshold boosting current value $I_{th}$. The threshold boosting current value $I_{th}$ may be preset based on the nature of the saturable inductor $L_{sat}$ used in the auxiliary switch path of the ARCPI 1102. Additionally and/or alternatively, the threshold boosting current value $I_{th}$ may be given in real time based on various application scenarios. Further, the threshold boosting current value $I_{th}$ may be stored in a memory reserved for the boosting current algorithm 1106. The threshold boosting current value $I_{th}$ may be also stored in a remote server or a remote cloud.

According to an exemplary embodiment of the present disclosure, if the input value of boosting current is larger than the threshold boosting current value $I_{th}$, the boosting time $T_{boost}$ may be determined according to Equation 1 based on the variables such as the power supply $V_{dc}$, the resonance inductance $L_r$ in the auxiliary switch path and the input value of boosting current. Additionally and/or alternatively, the boosting current algorithm 1106 may determine the boosting time $T_{boost}$ by summing a boosting time $T_{boost}$ calculated according to Equation 1 with an extension of time. For example, the time extended is a point of time at which the at least one saturable inductor $L_{sat}$ reaches a saturation.

According to an exemplary embodiment of the present disclosure, if the input value of boosting current is less than the threshold boosting current value $I_{th}$, it indicates that the boosting current and boosting time of the auxiliary current in the auxiliary switch path of the ARCPI 1102 are in a non-linear relationship due to the nature of the saturable inductor $L_{sat}$ used in the auxiliary switch path. A simple equation such as Equation 1 and/or a minor adjustment of inductance and/or a straightforward extension of time will not be able to determine accurate boosting time based on the input value of boosting current. Under this circumstance, a look-up table may be exploited to determine the boosting time of the auxiliary current in the auxiliary switch path of the ARCPI 1102.

For example, the look-up table may include a relationship between boosting current $I_{boost}$ and boosting time $T_{boost}$ of the auxiliary current in the auxiliary switch path of the ARCPI 1102. This relationship may include at least one non-linear relationship over a time span for the auxiliary current in the auxiliary switch path. Additionally and/or alternatively, the look-up table may include at least one non-linear approximation of auxiliary current in the auxiliary switch path. For example, the at least one non-linear approximation may be based on curve fitting equations that define a relation between boosting current $I_{boost}$ and boosting time $T_{boost}$ of the auxiliary current in the auxiliary switch path. Additionally and/or alternatively, other data may be also used for defining the at least one non-linear approximation of the auxiliary current in the auxiliary switch path of the ARCPI 1102.

As shown in FIG. 11, after determining the boosting time of the auxiliary current in the auxiliary switch path of the ARCPI 1102 based on the input value of boosting current, the boosting current algorithm 1106 outputs the boosting time $T_{boost}$ to the ARCPI signal generator 1104. Then, based on the determined boosting time $T_{boost}$, the ARCPI signal generator 1104 adjusts the timing of a switch for the ARCPI 1102 by outputting $S_1$, $S_{a1}$, $S_{a2}$ and/or $S_2$ to the ARCPI 1102. As such, the boosting current of the auxiliary current in the auxiliary switch path of the ARCPI 1102 is more accurately triggered even under the influence of the non-linearity due to the saturable inductor $L_{sat}$ used in the auxiliary path of the ARCPI 1102. In other words, the advantages of using the saturable inductor $L_{sat}$ in the auxiliary switch path of the ARCPI 1102 to guarantee a zero voltage switching are maintained.

The ARCPI controller 1100 controls the boosting current of the auxiliary current in the auxiliary switch path of the ARCPI by outputting $S_1$, $S_{a1}$, $S_{a2}$ and/or $S_2$ to the ARCPI. The output of $S_1$, $S_{a1}$, $S_{a2}$ and/or $S_2$ to control the boosting current of the auxiliary current is based on the boosting time of the auxiliary current. The boosting time of the auxiliary current is determined by using Equation 1 and/or a minor adjustment based on empirical data and/or an extension of time upon a saturation of at least one saturable inductor used in the auxiliary switch path of the ARCPI. The boosting time of the auxiliary current is also determined by using a look-up table to make non-linear approximation of the auxiliary current in the auxiliary switch path of the ARCPI. As such, the impact on the accuracy of the boosting current of the auxiliary current in the auxiliary switch path of the ARCPI by the use of the at least one saturable inductor is minimized.

Figure 12:
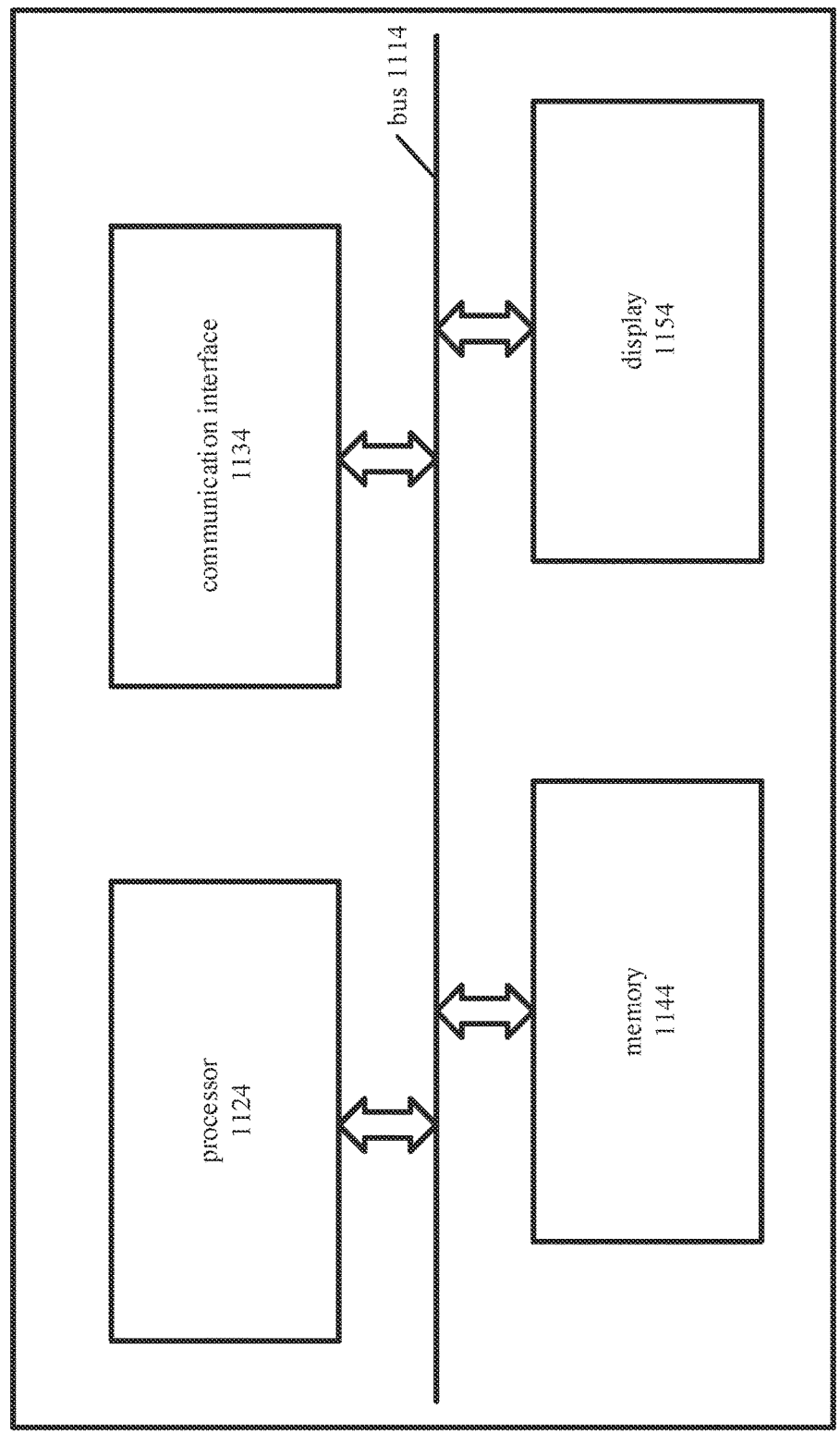
FIG. 12 is a schematic diagram of a structure of an ARCPI signal generator according to an exemplary embodiment of the present disclosure.

FIG. 12 is a schematic diagram of a structure of an ARCPI signal generator. As shown in FIG. 12, the ARCPI signal generator 1104 may include a bus 1114, a processor 1124, a communication interface 1134 and a memory 1144. Additionally and/or alternatively, the ARCPI signal generator 1104 may further include a display 1154. For example, the processor 1124, the communication interface 1134, the memory 1144 and the display 1154 may communicate with each other through the bus 1114.

The processor 1124 may include one or more general-purpose processors, such as a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1144 may include a volatile memory, for example, a random access memory (RAM). The memory 1144 may further include a non-volatile memory (NVM), for example, a read-only memory (ROM), a flash memory, a hard disk drive (HDD), or a solid-state drive (SSD). The memory 1144 may further include a combination of the foregoing types.

The memory 1144 may have computer-readable program codes stored thereon. The processor 1124 may read the computer-readable program codes stored on the memory 1144 to implement the methods 700, 800, 900 or 1000 described above to determine boosting time of the auxiliary current in the auxiliary switch path of the ARCPI 1102 shown in FIG. 11. Additionally and/or alternatively, the processor 1124 may read the computer-readable program codes stored on the memory 1144 to implement one or more other functions, a combination of these functions.

The processor 1124 may further communicate with another computing device through the communication interface 1134. For example, the processor 1124 may communicate with the VFD controller 1108 shown in FIG. 11 for receiving the two switch signals $S'_1$ and $S'_2$ for the two IGBTs, the main switches $S_1$ and $S_2$, used in the ARCPI 1102 shown in FIG. 11 as the inputs for the ARCPI signal generator 1104. For example, the processor 1124 may communicate with the boosting current algorithm 1106 shown in FIG. 11 for outputting the (desired) value of boosting current to the boosting current algorithm 1106, and further, for receiving the boosting time accordingly determined by the boosting current algorithm 1106.

The processor 1124 may further trigger the display 1154 to display information to a user. For example, the processor 1124 may trigger the display 1154 to display the value of boosting current that is entered by the user for operating the boosting current algorithm 1106 shown in FIG. 11. For example, the processor 1124 may trigger the display 1154 to display a real time status of the process for generating $S_1$, $S_{a1}$, $S_{a2}$ and/or $S_2$ by the ARCPI signal generator 1104 shown in FIG. 11.

A person of ordinary skill in the art will appreciate that the ARCPI signal generator 1104 as shown in FIG. 12 may communicate with one or more further computing devices through the communication interface 1134 or wireless connections for further functions, or a combination of functions. The ARCPI signal generator 1104 may also include one or more further functional components to perform and/or trigger further functions, or a combination of functions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of the present disclosure are described herein, including the best mode known to the inventors for carrying out the disclosure. Variations of those exemplary embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for an auxiliary device of an auxiliary resonant commutated pole inverter (ARCPI) to determine a boosting time of the ARCPI, wherein the auxiliary device comprises an auxiliary switch path that uses a resonant inductor with at least one saturable inductor, comprising:
    calculating, by a processor of the auxiliary device, a first boosting time in the auxiliary switch path based on a theoretical resonance inductance and a voltage that are applied to the resonant inductor;
    determining, by the processor, a second boosting time in the auxiliary switch path based on a look-up table; and
    determining, by the processor, the boosting time in the auxiliary switch path based on the first boosting time and the second boosting time.

2. The method according to claim 1, further comprising: obtaining, by the processor, a value of boosting current of the ARCPI.

3. The method according to claim 2, wherein calculating, by the processor of the auxiliary device, the first boosting time in the auxiliary switch path based on the theoretical resonance inductance and the voltage that are applied to the resonant inductor is made in response to the value of the boosting current of the ARCPI being larger than a threshold.

4. The method according to claim 3, wherein determining, by the processor, the second boosting time in the auxiliary switch path based on the look-up table is made in response to the value of the boosting current of the ARCPI being less than the threshold.

5. The method according to claim 4, wherein determining, by the processor, the boosting time in the auxiliary switch path based on the first boosting time and the second boosting time comprises:
    in response to the value of the boosting current of the ARCPI being larger than the threshold, the boosting time in the auxiliary switch path equaling to the first boosting time in the auxiliary switch path; and
    in response to the value of the boosting current of the ARCPI being less than the threshold, the boosting time in the auxiliary switch path equaling to the second boosting time in the auxiliary switch path.

6. The method according to claim 5, wherein, in response to the value of the boosting current of the ARCPI being larger than the threshold, the boosting time in the auxiliary switch path equaling to the first boosting time in the auxiliary switch path comprises the boosting time in the auxiliary switch path equaling to a sum of the first boosting time in the auxiliary switch path and a time at which the at least one saturable inductor reaches a saturation.

7. The method according to claim 1, wherein calculating, by the processor of the auxiliary device, the first boosting time in the auxiliary switch path based on the theoretical resonance inductance and the voltage that are applied to the resonant inductor is according to an equation:

$$\frac{Vdc}{2} = L_r \frac{\Delta I}{\Delta t} = L_r \frac{Iboost}{Tboost},$$

and wherein $V_{dc}$ represents the voltage, the voltage being direct current (DC) bus voltage, $L_r$ represents the resonance inductance, $T_{boost}$ represents the first boosting time in the auxiliary switch path, and $I_{boost}$ represents first boosting current corresponding to the first boosting time in the auxiliary switch path.

8. The method according to claim 1, wherein the look-up table comprises at least one non-linear approximation of auxiliary current in the auxiliary switch path.

9. The method according to claim 8, wherein the at least one non-linear approximation is based on curve fitting equations that define a relation between boost current and boost time in the auxiliary switch path.

10. The method according to claim 1, further comprising:
    controlling, by the processor, boosting current of the ARCPI based on the boosting time in the auxiliary switch path.

11. The method according to claim 1, wherein the boosting time in the auxiliary switch path is corrected in each switch cycle of the auxiliary switch path based on a measured output of the auxiliary switch path.

12. An auxiliary device of an auxiliary resonant commutated pole inverter (ARCPI) for controlling boosting current of the ARCPI, wherein the auxiliary device comprises an auxiliary switch path that uses a resonant inductor with at least one saturable inductor, wherein the auxiliary device comprises a processor, and wherein the auxiliary device is configured to:
    obtain a value of the boosting current of the ARCPI;
    in response to the value of the boosting current of the ARCPI being larger than a threshold, calculate a first boosting time in the auxiliary switch path based on a theoretical resonance inductance and a voltage that are applied to the resonant inductor;

in response to the value of the boosting current of the ARCPI being less than the threshold, determine a second boosting time in the auxiliary switch path based on a look-up table;

determine a boosting time in the auxiliary switch path based on the first boosting time and the second boosting time; and control the boosting current of the ARCPI based on the boosting time in the auxiliary switch path.

13. The device according to claim 12, wherein determining the boosting time in the auxiliary switch path based on the first boosting time and the second boosting time comprises:

in response to the value of the boosting current of the ARCPI being larger than the threshold, the boosting time in the auxiliary switch path equaling to the first boosting time in the auxiliary switch path; and in response to the value of the boosting current of the ARCPI being less than the threshold, the boosting time in the auxiliary switch path equaling to the second boosting time in the auxiliary switch path.

14. The device according to claim 13, wherein, in response to the value of the boosting current of the ARCPI being larger than the threshold, the boosting time in the auxiliary switch path equaling to the first boosting time in the auxiliary switch path comprises the boosting time in the auxiliary switch path equaling to a sum of the first boosting time in the auxiliary switch path and a time at which the at least one saturable inductor reaches a saturation.

15. The device according to claim 12, wherein, in response to the value of the boosting current of the ARCPI being larger than the threshold, calculating the first boosting time in the auxiliary switch path based on the theoretical resonance inductance and the voltage that are applied to the resonant inductor is according to an equation:

$$\frac{Vdc}{2} = L_r \frac{\Delta I}{\Delta t} = L_r \frac{Iboost}{Tboost},$$

and wherein $V_{dc}$ represents the voltage, the voltage being direct current (DC) bus voltage, $L_r$ represents the resonance inductance, $T_{boost}$ represents the first boosting time in the auxiliary switch path, and $I_{boost}$ represents first boosting current corresponding to the first boosting time in the auxiliary switch path.

16. The device according to claim 12, wherein the look-up table comprises at least one non-linear approximation of auxiliary current in the auxiliary switch path.

17. The device according to claim 16, wherein the at least one non-linear approximation is based on curve fitting equations that define a relation between boost current and boost time in the auxiliary switch path.

18. A method for an auxiliary device of an auxiliary resonant commutated pole inverter (ARCPI) to determine a boosting time of the ARCPI, wherein the auxiliary device comprises an auxiliary switch path, comprising:

obtaining, by a processor of the auxiliary device, a value of boosting current of the ARCPI;

in response to the value of the boosting current of the ARCPI being less than the threshold, determining, by the processor, the boosting time in the auxiliary switch path based on a look-up table; and controlling, by the processor, the boosting current of the ARCPI based on the boosting time in the auxiliary switch path.

19. The method according to claim 18, wherein the look-up table comprises at least one non-linear approximation of auxiliary current in the auxiliary switch path.

20. The method according to claim 19, wherein the at least one non-linear approximation is based on curve fitting equations that define a relation between boost current and boost time in the auxiliary switch path.

* * * * *